United States Patent
Näslund et al.

(10) Patent No.: US 10,965,660 B2
(45) Date of Patent: *Mar. 30, 2021

(54) COMMUNICATION BETWEEN A COMMUNICATION DEVICE AND A NETWORK DEVICE

(71) Applicant: Telefonaktiebolaget L M Ericsson (publ), Stockholm (SE)

(72) Inventors: Mats Näslund, Bromma (SE); Bengt Sahlin, Espoo (FI); Karl Norrman, Stockholm (SE); Jari Arkko, Kauniainen (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/558,891

(22) Filed: Sep. 3, 2019

(65) Prior Publication Data

US 2019/0394184 A1    Dec. 26, 2019

Related U.S. Application Data

(63) Continuation of application No. 16/043,842, filed on Jul. 24, 2018, now Pat. No. 10,659,447, which is a
(Continued)

(51) Int. Cl.
*H04L 29/06* (2006.01)
*H04L 9/08* (2006.01)
(Continued)

(52) U.S. Cl.
CPC ............ *H04L 63/08* (2013.01); *G06F 21/602* (2013.01); *H04L 9/0816* (2013.01);
(Continued)

(58) Field of Classification Search
None
See application file for complete search history.

(56) References Cited

U.S. PATENT DOCUMENTS

| | | | |
|---|---|---|---|
| 5,491,749 A | 2/1996 | Rogaway | |
| 5,867,578 A * | 2/1999 | Brickell | G06Q 20/3829 713/180 |

(Continued)

FOREIGN PATENT DOCUMENTS

| | | |
|---|---|---|
| EP | 2 249 593 A1 | 11/2010 |
| EP | 2 437 469 B1 | 5/2013 |

(Continued)

OTHER PUBLICATIONS

Indian Examination Report for Indian Application No. 201717027142 dated Feb. 20, 2020, 12 Pages.
(Continued)

*Primary Examiner* — Maung T Lwin
(74) *Attorney, Agent, or Firm* — Sage Patent Group

(57) ABSTRACT

A communication device of a communication network receives, via a network, a challenge, generates a first Diffie Hellman, DH, parameter, a first verification code for the first DH parameter, forwards the challenge or a derivative thereof to an identity module, receives at least one result parameter as response from the identity module, determines, based on the result parameter, whether the first DH parameter is authentic, and if the first DH parameter is authentic, generates and sends a second DH parameter to the network device for session key generation based on the first DH parameter and the second DH parameter.

20 Claims, 8 Drawing Sheets

Related U.S. Application Data continuation of application No. 15/096,644, filed on Apr. 12, 2016, now Pat. No. 10,057,232, which is a continuation of application No. 14/770,774, filed as application No. PCT/SE2015/050822 on Jul. 13, 2015, now Pat. No. 9,787,661.

(60) Provisional application No. 62/121,689, filed on Feb. 27, 2015.

(51) Int. Cl.
*H04W 12/10* (2021.01)
*H04W 12/04* (2021.01)
*H04W 12/06* (2021.01)
*G06F 21/60* (2013.01)
*H04L 9/32* (2006.01)

(52) U.S. Cl.
CPC ......... *H04L 9/0844* (2013.01); *H04L 9/3271* (2013.01); *H04L 63/0428* (2013.01); *H04L 63/06* (2013.01); *H04L 63/0853* (2013.01); *H04L 63/0869* (2013.01); *H04W 12/0401* (2019.01); *H04W 12/04031* (2019.01); *H04W 12/0609* (2019.01); *H04W 12/10* (2013.01); *H04L 63/123* (2013.01); *H04L 2463/082* (2013.01)

(56) References Cited

U.S. PATENT DOCUMENTS

| | | | |
|---|---|---|---|
| 7,107,620 | B2 | 9/2006 | Haverinen et al. |
| 7,434,054 | B2* | 10/2008 | Zick .................. H04L 63/1441 713/171 |
| 7,676,042 | B2* | 3/2010 | Okamoto ............... H04L 69/40 380/278 |
| 7,715,822 | B2 | 5/2010 | Semple et al. |
| 7,966,000 | B2 | 6/2011 | Semple et al. |
| 8,412,157 | B2 | 4/2013 | Wang et al. |
| 8,572,385 | B2* | 10/2013 | Papamanthou ....... H04L 9/3236 713/171 |
| 8,850,540 | B2* | 9/2014 | Lin ..................... H04L 63/0838 726/7 |
| 9,088,408 | B2 | 7/2015 | Campagna et al. |
| 9,264,900 | B2* | 2/2016 | Sun ................... H04W 12/0602 |
| 9,300,641 | B2 | 3/2016 | Laitinen et al. |
| 9,503,438 | B2 | 11/2016 | Choyi et al. |
| 9,628,237 | B2 | 4/2017 | Kim et al. |
| 9,628,273 | B2 | 4/2017 | Alshammari |
| 2003/0229789 | A1 | 12/2003 | Morais et al. |
| 2005/0086342 | A1 | 4/2005 | Burt et al. |
| 2006/0025141 | A1 | 2/2006 | Marsh et al. |
| 2006/0095766 | A1* | 5/2006 | Zhu ...................... H04L 9/0844 713/168 |
| 2006/0179319 | A1 | 8/2006 | Krawczyk |
| 2006/0205388 | A1 | 9/2006 | Semple et al. |
| 2006/0206710 | A1* | 9/2006 | Gehrmann ........... H04L 63/061 713/168 |
| 2006/0291661 | A1* | 12/2006 | Ramzan ................ H04L 9/0844 380/277 |
| 2007/0157026 | A1 | 7/2007 | Zimmerman |
| 2007/0192602 | A1 | 8/2007 | Blom et al. |
| 2007/0234041 | A1 | 10/2007 | Lakshmeshwar et al. |
| 2008/0137848 | A1* | 6/2008 | Kocher ............. G11B 20/00253 380/201 |
| 2009/0063863 | A1* | 3/2009 | Durand ................. H04L 9/0844 713/171 |
| 2009/0100264 | A1 | 4/2009 | Futa et al. |
| 2009/0209232 | A1 | 8/2009 | Cha et al. |
| 2009/0220091 | A1 | 9/2009 | Howard |
| 2010/0202455 | A1 | 8/2010 | Sundaram et al. |
| 2011/0004754 | A1 | 1/2011 | Walker et al. |
| 2011/0055585 | A1 | 3/2011 | Lee |
| 2011/0213977 | A1* | 9/2011 | Little ................ H04W 12/0401 713/171 |
| 2011/0238972 | A1 | 9/2011 | Semple et al. |
| 2011/0258452 | A1* | 10/2011 | Coulier ................ H04L 9/3271 713/171 |
| 2013/0080769 | A1 | 3/2013 | Cha et al. |
| 2013/0268444 | A1 | 10/2013 | Namgoong et al. |
| 2013/0298209 | A1 | 11/2013 | Targali et al. |
| 2014/0004824 | A1 | 1/2014 | Campagna et al. |
| 2014/0201809 | A1 | 7/2014 | Choyi et al. |
| 2014/0281525 | A1* | 9/2014 | Acar ..................... H04L 9/3213 713/168 |
| 2015/0031334 | A1 | 1/2015 | Wu |
| 2015/0052352 | A1 | 2/2015 | Dolev et al. |
| 2015/0118995 | A1 | 4/2015 | Aksu et al. |
| 2015/0244685 | A1 | 8/2015 | Shah et al. |
| 2016/0226847 | A1 | 8/2016 | Bone et al. |
| 2016/0227410 | A1 | 8/2016 | Narasimha et al. |
| 2016/0277956 | A1 | 9/2016 | Lindheimer et al. |
| 2017/0339118 | A1* | 11/2017 | Hwang ................. H04L 9/3247 |

FOREIGN PATENT DOCUMENTS

| | | |
|---|---|---|
| WO | WO 2001/063954 A1 | 8/2001 |
| WO | WO 2006/084183 A1 | 8/2006 |
| WO | WO 2007/042512 A2 | 4/2007 |

OTHER PUBLICATIONS

Final Office Action for U.S. Appl. No. 14/770,774 (dated May 22, 2017).

Lai, C. et al., "SE-AKA: A secure and efficient group authentication and key agreement protocol for LTE networks," Computer Networks No. 57 (2013), pp. 3492-3510.

Examiner's Pre-Review Report for Japanese Patent Application No. 2017-545344 dated Jul. 5, 2019, including English summary, 4 pages.

* cited by examiner

COMMUNICATION BETWEEN A COMMUNICATION DEVICE AND A NETWORK DEVICE

CROSS REFERENCE TO RELATED APPLICATIONS

This application is a continuation of U.S. patent application Ser. No. 16/043,842, filed 24 Jul. 2018, which is a continuation of U.S. patent application Ser. No. 15/096,644, filed 12 Apr. 2016 (now U.S. Pat. No. 10,057,232), which is a continuation of U.S. patent application Ser. No. 14/770,774, filed 26 Aug. 2015 (now U.S. Pat. No. 9,787,661), which itself is a 35 U.S.C. § 371 national stage application of PCT International Application No. PCT/SE2015/050822, filed 13 Jul. 2015, which itself claims priority to U.S. provisional Application No. 62/121,689, filed 27 Feb. 2015, the disclosures and contents of which each are incorporated by reference herein in their entirety.

TECHNICAL FIELD

The invention relates to a communication device for communicating with a network device, a method, computer program and computer program product for a communication device in communication with a network device of a communication network, a first network device of a first communication network, a method, computer program and computer program product for a first network node of a first communication network as well as to a system comprising a first network device in a first communication system and a second network device in a second communication system. The invention also relates to the second network device.

BACKGROUND

Data transferred over communication networks is becoming increasingly sensitive. Communication networks, such as mobile, wireless and fixed communication networks, are nowadays more and more frequently used for e.g. various economical and business related transactions, control of cyber-physical systems, etc. Therefore there is a need for stronger security measures.

In for instance mobile communications it is important that the communication network and user equipment (UE) mutually authenticate each other and are able to encrypt exchanged traffic data, where both of these security services being critically dependent on secure key management including key agreement or key establishment.

In this respect, mobile networks from second generation (2G) and onward have made use of strong, (Universal) Subscriber Identity Module ((U)SIM) card based authentication and encryption key agreement. From third generation (3G) networks and on, authentication has been mutual: both network and user equipment authenticate each other. USIM based 3G/4G authentication is described in e.g. 3GPP TS 33.102 V12.2.0 and 33.401 V12.13.0. The protocol is known as UMTS AKA or LTE AKA, depending on which access network type is used, where UMTS AKA is an acronym for Universal Mobile Telecommunication System Authentication and Key Agreement and LTE AKA is an acronym for Long Term Evolution Authentication and Key Agreement. As a note, while the 3GPP standards use the term key agreement, the protocols actually used are more of key establishment nature. The difference is however not important for the discussion. Variants of this AKA protocol have been developed for IP Multimedia Subsystem (IMS), IMS AKA, non-3GPP access technologies (EAP-AKA, IETF RFC 4187) and for general service layer authentication (Generic Bootstrapping Architecture, GBA, 3GPP TS 33.220 V12.3.0).

FIG. 1 shows the functioning of AKA on a high level for a 3G network according to TS 33.102 V12.2.0, where a mobile station MS, which is a type of communication device that corresponds to a user equipment, communicates with a Visiting Location Register (VLR)/Serving Gateway Support Node (SGSN) of a serving network (SN), which in turn communicates with a Home Environment (HE)/Home Location Register (HLR). In 4G/LTE, a Mobile Management Entity (MME) takes the place of VLR/SGSN and HE/HLR corresponds to Home Subscriber Server (HSS).

In FIG. 1 the VLR/SGSN is shown as sending an authentication data request 10 to the HE/HLR concerning a visiting mobile station MS. The HE/HLR generates 12 a set of authentication vectors (AV(1 . . . n)) and sends the vectors (AV1 . . . n) to the VLR/SGSN in an Authentication data response message 14, where the VLR/SGSN then stores 16 the authentication vectors. These steps here together form a phase 17 of distribution and authentication vectors from the HE.

Thereafter follows an authentication and key establishment (or key agreement) phase 31. When authentication is to take place in this phase 31, the VLR/SGSN selects 18 an available (unused) authentication vector and based on the content of this vector it sends a user authentication request message ARQ 20 comprising a challenge using a random value Rand(i) and an authentication token AUTN(i), where AUTN(i) comprises a challenge verification code, and the index i indicates that the value is associated with $AV_i$. The AUTN(i) is verified in the MS, and if verification succeeds, a result RES(i) is computed in a verification step 22. To be precise, these operations are carried out by the USIM in the MS. The MS then sends a user authentication response message (ARE) 20 comprising the result RES(i). The authentication vector comprises the expected result XRES(i) and the VLR/SGSN then compares 26 the received result RES(i) with the expected result XRES(i), and if the comparison was successful (i.e. the two values being equal), the VLR/SGSN then selects 30 a corresponding ciphering key CK(i) and integrity protection key IK(i). At the same time, the MS (again, to be precise, the USIM) computes 28 the same keys CK(i) and IK(i). In the case of LTE, further keys are derived from CK(i) and IK(i), e.g. a so called Kasme key (not shown), this derivation being done in the part of the MS that is outside the USIM. This part outside of the USIM is referred to as Mobile Equipment (ME).

In an authentication and key agreement of the type shown in FIG. 1 and described above, a secret key K, with advantage pre-shared, is used and stored both in the user equipment (specifically, in the USIM) and in the home network. The shared key K is then used for deriving CK (i) and IK (i).

The security of AKA thus depends on the key K being kept secret. Recently, it was reported in media that a USIM card manufacturer's security had been breached and a set of K-keys had "leaked out" (or fallen into wrong hands), thus putting the subscribers associated with these keys at risks such as impersonation, connection hijacking, and eavesdropping (since also the ciphering keys, derived from CK(i) and/or IK(i), are thus potentially also at risk). In the article, https://firstlook.org/theintercept/2015/02/19/great-sim-heist/, retrieved on 6 Jul. 2015, it was mentioned that a potential problem with the AKA protocol, leading to the aforementioned security implications, lied in that AKA lacks so called perfect forward secrecy (PFS).

It is in view of what has been described above of interest to raise the security level of communication between a communication device and a communication network when the security is based on identity modules such as USIM making use of a secret/key shared with a communication network node.

There is thus a need for enhancing communication security between a communication device and a communication network.

SUMMARY

One object of invention is to enhance the communication security of a communication device in relation to the use of long-term shared keys.

This object is according to a first aspect achieved by a communication device, which is in communication with a network device of a communication network. The communication device comprises at least one processor circuit and at least one memory connected to the at least one processor circuit and storing program instructions that are executed by the at least one processor to perform operations comprising:

receiving, via a network, a challenge, a first Diffie-Hellman, DH, parameter and a first verification code for the first DH parameter from the network device, forwarding the challenge or a derivative thereof to an identity module, receive at least one result parameter as response from the identity module, the at least one result parameter having been generated by the identity module and being one of a ciphering key, CK, an integrity key, CK, and a response parameter, RES, responsive to determining that the first DH parameter is authentic, generating a second DH parameter and sending, through the network, the second DH parameter to the network device.

The object is according to a second aspect achieved through a method performed by a communication device, which communication device is in in communication with a network device of a communication network. The method comprises:

receiving, via a network, a challenge, a first Diffie-Hellman, DH, parameter and a first verification code for the first DH parameter from the network device, forwarding the challenge or a derivative thereof to an identity module, receiving at least one result parameter as response from the identity module, the at least one parameter having been generated by the identity module and being one of a ciphering key, CK, an integrity key, IJ, and a response parameter, RES, determining, based on said result parameter whether the first DH parameter is authentic, and responsive to determining that the first DH parameter is authentic, generating a second DH parameter and sending, through the network, the second DH parameter to the network device.

The object is according to a third aspect achieved through a computer program for a communication device in communication with a network device of a communication network. The computer program comprises computer program code which when run in the communication device, causes the communication device to:

receive, via a network, a challenge, a first Diffie-Hellman, DH, parameter and a first verification code for the first DH parameter from the network device, forward the challenge or a derivative thereof to an identity module, receive at least one result parameter as response from the identity module, the at least one response parameter having been generated by the identity module and being one of a ciphering key, CK, an integrity key, IK, and a response parameter, RES, determine, based on said result parameter whether the first DH parameter is authentic, and responsive to determining the first DH parameter is authentic, generate a second DH parameter and send, through the network, the second DH parameter to the network device for session key generation based on the first DH parameter and the second DH parameter.

The object is according to a fourth aspect achieved through a computer program product for a communication device in communication with a network node of a communication network. The computer program product comprises a data storage medium with computer program code according to the third aspect.

The invention according to the first, second and fourth aspects have a number of advantages. The enhanced security sets up barriers against attackers who are able to compromise the long term shared key, forcing them to launch so-called man-in-the-middle attacks to exploit the compromised key.

A derivative may be identical to the challenge. A derivative may also be a hash of the challenge.

If a derivative that is a hash of the challenge is used, the size of the challenge is reduced and also adaptable to standardised challenge sizes. The provision of a pure challenge to the identity module has the advantage of reducing processing in the communication device.

In a first variation of the first aspect, the communication device is configured to generate a session key for communication between the communication device and the network device, where the session key is at least based on values used for generating the first DH parameter and the second DH parameter.

In a corresponding variation of the second aspect the method comprises generating a session key for communication between the communication device and the network device, where the session key is at least based on values used for generating the first DH parameter and the second DH parameter.

This variation has the advantage of providing a session that has enhanced communication security against potential future shared-key compromise.

In a more specific embodiment of the first and second aspects, the session key is based on the first DH parameter and an exponent of the second DH parameter.

The first verification code may comprise a message authentication code based on at least the first DH parameter. Being based on at least the second DH parameter means in one embodiment that it may be based on at least a hash of the first DH parameter and that the hash may be a cryptographic hash. Furthermore, the challenge may be based on the first DH parameter. It may for instance be the first DH parameter or a hash of the first DH parameter. It is possible that also this hash is a cryptographic hash. Through the challenge being based on the first DH parameter, there is provided economy in cryptography and bandwidth usage. This economy is even further enhanced through the provision of a hash, which allows the size of the first DH parameter to be adapted to various standardised formats.

In a third variation of the first aspect, the communication device is configured to receive the challenge, the first DH parameter and the first verification code in an authentication request message from the network device and in this case the authentication request message also comprises a challenge verification code. Furthermore, when the communication device receives the at least one result parameter, it is configured to receive a response parameter as a response to the challenge. Finally, when the communication device is configured to generate and send the second DH parameter, it is configured to generate the second DH parameter together with a second verification code and send these in an authentication response message also comprising the response parameter.

In a corresponding variation of the second aspect, the challenge, the first DH parameter and the first verification code are received in an authentication request message, which authentication request message also comprises a challenge verification code. The at least one result parameter also comprises a response parameter received as a response to the challenge. Furthermore, the generating and sending of the second DH parameter comprises generating the second DH parameter together with a second verification code and sending these in an authentication response message also comprising the response parameter.

This variation has the advantage of allowing the first and second DH parameters and the first and second verification codes to be transferred in already existing messages. Thereby additional messages are avoided. This may save energy in the communication device, which may be a limited resource.

The second verification code may be generated as a message authentication code based on at least the second DH parameter. Being based on at least the second DH parameter means in one embodiment that it may be based on at least a hash of the second DH parameter and the hash may be a cryptographic hash.

Hash/message authentication codes may furthermore be based on HMAC/SHA-256.

In a fourth variation of the first and second aspects, the authentication request message comprises the first verification code in a corresponding separate information element of the authentication request message.

In this case the communication device is configured to use the first verification code when determining the authenticity of the first DH parameter.

In this case the determining of the authenticity of the first DH parameter made in the method is made using the first verification code.

In a fifth variation of the first and second aspects, the first verification code is provided as at least part of the challenge verification code.

In this case the communication device is configured to determine the authenticity of the first DH parameter based on the identity module providing the at least one result parameter.

In this case the determining of the authenticity of the first DH parameter made in the method is made based on the identity module providing the at least one result parameter.

This variation provides further economy in the cryptography used in the authentication request message.

In a sixth variation of the first aspect, the communication device is configured to generate the second verification code based on at least one of the at least one result parameters and to send the second verification code in an information element assigned to the response parameter in the authentication response message.

In a corresponding variation of the second aspect, the method comprises basing the second verification code on the response parameter. In this case the sending of the authentication response also comprises sending the second verification code in an information element of the authentication response message assigned to the response parameter.

This variation provides further economy in the bandwidth and cryptography used in the authentication response message and its processing.

The communication device may be a user equipment and may also comprise a mobile equipment, in which the computer instructions that the processor acts on are stored. It is furthermore possible that the communication device comprises the identity module, where the identity module in turn comprises a key and cryptographic processing means.

Another object is to provide enhanced communication security of a first network device in a communication network in relation to the use of long-term shared keys.

This object is according to a fifth aspect achieved through a first network device of a first communication network. The first network device being configured to:
 obtain a challenge,
 obtain a first DH parameter,
 obtain a first verification code for the first DH parameter,
 send the challenge, the first DH parameter and the first verification code to a communication device,
 receive a second DH parameter, a second verification code and a response parameter from the communication device,
 determine the authenticity of the response parameter, and
 verify the second DH parameter based on the second verification code.

The object is according to a sixth aspect achieved through a method for a first network device of a communication network. The method is performed by the first network device and comprises:
 obtaining a challenge,
 obtaining a first DH parameter,
 obtaining a first verification code for the first DH parameter,
 sending the challenge, the first DH parameter and the first verification code to a communication device,
 receiving a second DH parameter, a second verification code and a response parameter from the communication device,
 determining the authenticity of the response parameter, and
 verifying the second DH parameter based on the second verification code.

The object is according to a seventh aspect achieved through a computer program for a first network device of a communication network. The computer program comprises computer program code which when run in the first network device causes the first network device to:
 obtain a challenge,
 obtain a first DH parameter,
 obtain a first verification code for the first DH parameter,
 send the challenge, the first DH parameter and the first verification code to a communication device,
 receive a second DH parameter, a second verification code and a response parameter from the communication device, determine the authenticity of the response parameter, and
verify the second DH parameter based on the second verification code.

The object is according to an eighth aspect achieved through a computer program product for a first network device of a communication network. The computer program product comprises a data storage medium with computer program code according to the seventh aspect.

The invention according to the fifth, sixth, seventh and eighth aspects enhance the security of communication between a first network device and a communication device. The enhanced security sets up barriers against so-called man-in-the-middle attacks.

In a first variation of the fifth aspect, the first network device is further configured to compute a session key for communication between the communication device and the first network device. The session key is at least based on values used for generating the first and second DH parameter.

In a corresponding variation of the sixth aspect the method further comprises computing a session key for communication between the communication device user equipment and the first network device, which session key is at least based on values used for generating the first and second DH parameter.

In a more specific embodiment of the fifth and sixth aspects, the session key is based on the second DH parameter and an exponent of the first DH parameter.

In a second variation of the fifth aspect, the first network device is configured to obtain a challenge verification code when obtaining the challenge, to send the challenge, the first DH parameter and the first verification code in an authentication request message together with the challenge verification code and to receive the second DH parameter, the second verification code and the response parameter in an authentication response message.

In a corresponding variation of the sixth aspect, the obtaining of a challenge comprises obtaining of a challenge verification code, the sending of the challenge, the first DH parameter and the first verification code comprises sending these in an authentication request message together with the challenge verification code and the receiving of the second DH parameter, the second verification code and the response parameter comprises receiving these in an authentication response message.

This has the advantage of re-using existing messages. This means that that the existing message structure of an existing authentication and key agreement protocol may be used without adding new messages. This may save energy on a general environmental level, since the sending of additional messages uses energy, which may be a limited resource in radio networks. Furthermore, network communication is also typically standardised and it is often much harder to agree on the introduction on new messages, than the adding of new information elements in already existing messages.

In a third variation of the fifth aspect, the second network device when obtaining the first verification code is configured to generate the first verification code using the first DH parameter and when sending the authentication request message is configured to send the first verification code in a corresponding separate information element of the authentication request message.

In a corresponding variation of the sixth aspect, the obtaining of the first verification code comprises generating the first verification code using the first DH parameter, and the sending of the authentication request message comprises sending the first verification code in a corresponding separate information element.

In a fourth variation of the fifth aspect, the first network device, when obtaining the first DH parameter, is further configured to receive a value to be used for generating the first DH parameter, to obtain the first verification code as at least part of the challenge verification code and to send the first verification code as at least part of the challenge verification code in the authentication request message.

In a corresponding variation of the sixth aspect, the method further comprises receiving a value for generating the first DH parameter, obtaining the first verification code as at least part of the challenge verification code and sending the first verification code as at least part of the challenge verification code in the authentication request message.

In a fifth variation of the fifth aspect, the first network device is configured to also obtain an expected challenge result and to determine the authenticity of the response parameter through a comparison with the expected challenge result.

In a corresponding variation of the sixth aspect, the method further comprises obtaining an expected challenge result together with the challenge and the determining the authenticity of the response parameter through a comparison with the expected challenge result.

In a sixth variation of the fifth and sixth aspects, the response parameter is included in the authentication response message through the second verification code being based on the response parameter.

In this case the first network device is configured to receive the second verification code in an information element of the authentication response message assigned to the response parameter and to simultaneously determine the authenticity of the response parameter and verify the second PFS parameter using the second verification code.

In this case the receiving of the authentication response message performed in the method comprises receiving the second verification code in an information element of the authentication response message assigned to the response parameter and the determining of the authenticity of the response parameter and the verifying of the second PFS parameter are performed simultaneously using the second verification code.

Yet another object is to provide a system for enhancing the communication security of a network device in relation to the use of long-term shared keys.

This object is according to a ninth aspect achieved through a system comprising a first network device in a first communication network and a second network device in a second communication network. The second network device is configured to send a challenge to the first network device.

The first network device is on the other hand configured to:
receive the challenge,
generate a first DH parameter,
obtain a first verification code for the first DH parameter,
send the challenge, the first DH parameter and the first verification code to the communication device,
receive a second DH parameter, a second verification code and a response parameter from the communication device,
determine the authenticity of the response parameter, and
verify the second DH parameter based on the second verification code.

In a first variation of the ninth aspect the second network device is configured to also provide a value for obtaining of the first DH parameter through generating it at least based on the value x, to generate the challenge verification code using the first DH parameter and send the base value to the first network device. The first network device is in turn configured to send the first verification code as the challenge verification code to the communication device.

The invention according to the ninth aspect also has the advantage of enhancing the security of communication between the first network device and the communication device. The enhanced security sets up barriers against attackers who are able to compromise the long term shared key, forcing them to launch so-called man-in-the-middle attacks to exploit the compromised key.

Furthermore, a tenth aspect of the invention relates to a second network device for a second communication network, the second network device being operative to:

receive, from a first network device of a first communication network, a request for authentication data related to an identity module of a communication device, generate a first DH parameter, generate a first verification code based on at least the first DH parameter and a key shared between the second network device and the identity module, and send in response to the request, to the first network device, at least the first verification code and a value from which the first DH parameter can be derived.

The value from which the first DH parameter can be derived, may in one embodiment of the second network device comprise the first DH parameter.

It should be emphasized that the term "comprises/comprising" when used in this specification is taken to specify the presence of stated features, integers, steps or components, but does not preclude the presence or addition of one or more other features, integers, steps, components or groups thereof. The word 'parameter' should be interpreted as covering values of the parameter, e.g. that the calculation of a parameter comprises the calculation of a value for that parameter, and that a calculation or derivation of a result or response based on one or more parameters comprises a calculation of the result or the response based on one or more values of the one or more parameters. In the same manner, receiving a parameter and sending/forwarding a parameter comprise the receiving and sending of a value of that parameter.

BRIEF DESCRIPTION OF THE DRAWINGS

The invention will now be described in more detail in relation to the enclosed drawings, in which.

DETAILED DESCRIPTION

Figure 1:
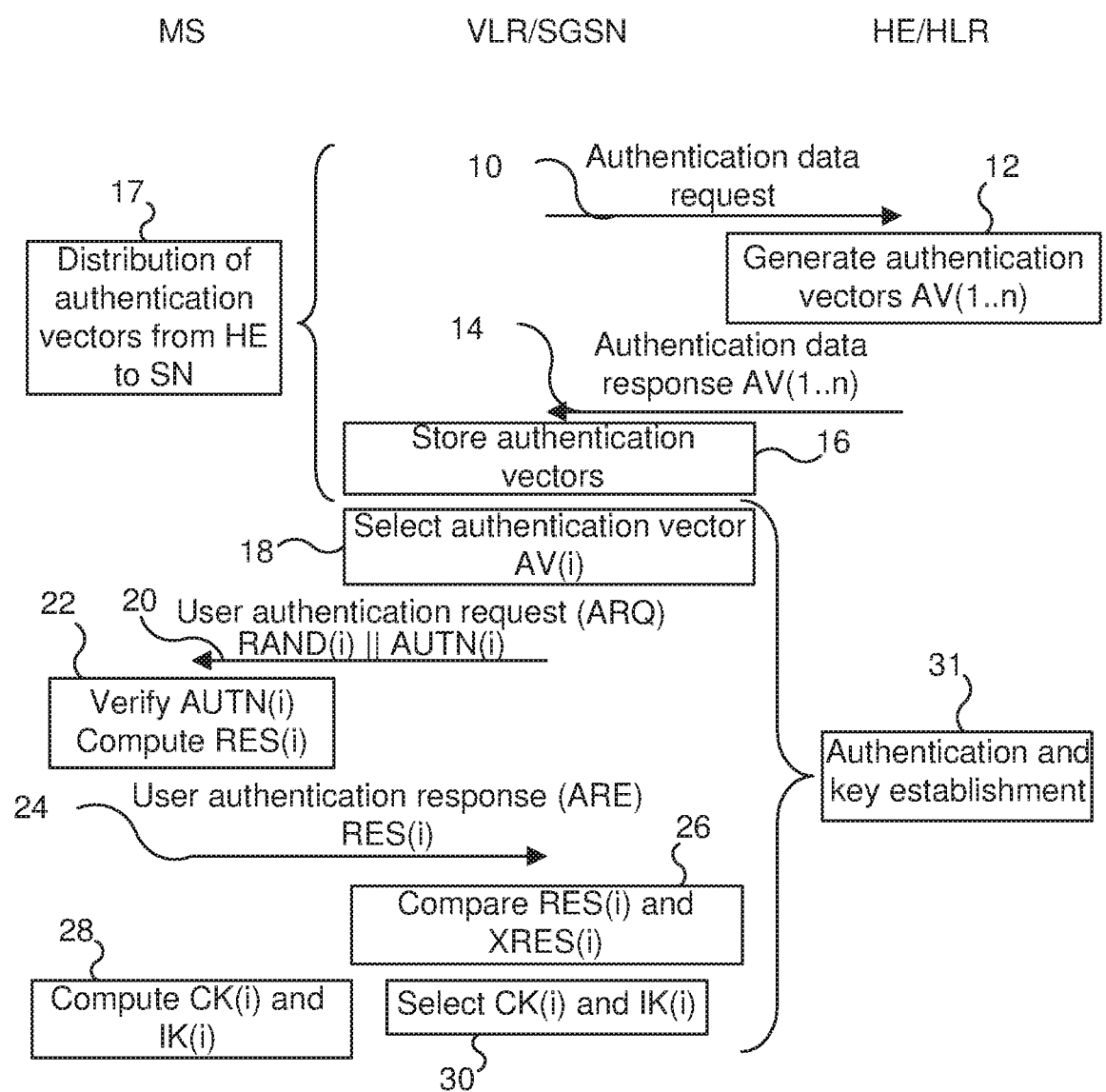
FIG. 1 schematically shows a diagram of a known authentication scheme performed between a communication device and a communication network, FIG. 2 schematically shows a first and second communication network as well as a communication device communicating with the first communication network, FIG. 3 schematically shows the use of a Diffie-Hellman protocol between the communication device and the first communication network.

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The invention concerns improved communication security in a communication network using pre-shared keys as basis for the communication security.

A communication network may here be a mobile communication network, such as a second Generation (2G) mobile communication network like Global System for Mobile communication (GSM), a third generation (3G) network like Universal Mobile Telecommunications System (UMTS) or a fourth generation (4G) network such as Long-Term Evolution (LTE) or any future, evolved system like the 3GPP $5^{th}$ Generation (5G) currently being developed. These are just a few examples of networks where the invention may be implemented. Other types of networks that may be used are for instance Wireless Local Area Networks (WLAN). A communication device, such as a user equipment (UE), a Mobile Station (MS), sometimes denoted a cellular phone, may communicate using these communication networks. Furthermore, a communication device here is connected to an identity module, where the identity module may be a smart card such as a universal integrated circuit card (UICC) holding a subscriber identity module (SIM) and/or a Universal Subscriber Identity Module (USIM) or an IP Multimedia Subsystem SIM (ISIM), an embedded SIM (eSIM) module, a software module, a Global Platform Trusted Execution module or the like. The identity module may thus also be implemented in software running in a trusted execution environment, or software running on a general purpose processor, although the latter is not preferred. In the sequel the term USIM will be used as an example in the descriptions, but the man skilled in the art will appreciate that any type of identity module will serve the same purpose. It should be realized that the identity module may be a part of the communication device. It may also be a separate entity that is connected to the communication device, when the communication device is to be used.

As a basis for communication security a key is used, e.g. for authentication and key agreement. The key may advantageously be pre-shared and stored in an identity module as just described.

In the following only the example of the communication device in the form of a UE will be discussed. However, it should be realized that the communication device is not limited to being a UE. It may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node. It may also be a communication modem providing, e.g., 3G or 4G connectivity for some form of electronics (e.g. a sensor or digital camera), a vehicle, a home gateway, home/residential WiFi/4G access point, a domestic appliance device like a refrigerator, thermostat, burglary alarm, vacuum cleaner, lawn mower robot or the like. It may also be a stationary terminal connected to a fixed communication network.

As was mentioned earlier and as is shown in FIG. 1, Authentication and Key Agreement (AKA) is a known key agreement system used in some communication networks.

As can be seen in FIG. 1, the Visitor Location Register/Serving Gateway Support Node (VLR/SGSN) is shown as sending an authentication data request 10 to the Home Environment/Home Location Register (HE/HLR) concerning a visiting user equipment (UE). The HE/HLR generates 12 a set of authentication vectors (AV(1 ... n)) and sends the vectors (AV(1 ... n)) to the VLR/SGSN in an authentication data response message 14, where the VLR/SGSN then stores 16 the authentication vectors.

The VLR/SGSN selects 18 an authentication vector and based on the content of this vector it sends a user authentication request message ARQ 20 comprising a challenge using a parameter RAND assigned a random value RAND(i) and an authentication token AUTN(i), where AUTN(i) also comprises a challenge verification code as will be elaborated in more detail below, and i denotes that the value is associated with $AV_i$. In the UE then AUTN(i) is verified and a result RES(i) is computed in a verification step 22. The UE then sends a user authentication response message (ARE) 20 comprising the result RES(i). The authentication vector comprises an expected result XRES(i) and the VLR/SGSN then compares 26 the received result RES(i) with the expected result XRES(i), and if the comparison was successful, i.e. if they were found to be equal, the VLR/SGSN then selects 30 the ciphering key CK(i) and integrity protection key IK(i). The UE also computes 28 the same keys CK(i) and IK(i). These are then used for obtaining sessions keys. In some systems (e.g. LTE) the keys CK(i) and IK(i) are used for obtaining a session key Kasme.

In an authentication of the type shown in FIG. 1 and described above, a secret key K, with advantage pre-shared, is used both in the user equipment and in the network.

It is foreseen that UMTS/LTE AKA will be used as a basis also in future generation mobile networks (e.g. 5G) due to its proven track record of security and robustness. In the sequel, unless otherwise noted, "AKA" will be used to denote UMTS AKA, LTE AKA, or a protocol based on these, e.g. a future extension for "5G" networks.

As was also mentioned earlier, the AKA protocol shown in FIG. 1 is compatible with 3GPP TS 33.102 where communication is taking place between a UE a Visitor Location Register/Serving Gateway Support Node (VLR/SGSN) and Home Environment/Home Location Register (HE/HLR). In 4G/LTE, Mobility Management Entity (MME) takes the place of VLR/SGSN and HE/HLR corresponds to Home Subscriber Server (HSS). Note that the terminal/UE/communication device is referred to as MS in this figure. For the purpose of this disclosure the MS and UE are the same entity.

The AUTN(i) (Authentication Token) is a parameter composed of different fields: AMF (Authentication Management Field), MAC and a sequence number indication (SQN, possibly encrypted/modified by an anonymity key AK). The MAC(i) is a Message Authentication Code that protects the challenge RAND(i) (RANDom number), as well as SQN and AMF from being forged by a 3rd party through the cryptographic functions implemented by the USIM. The keys CK(i) and IK(i) are used directly for ciphering/integrity protection in 3G and are used indirectly for these purposes in 4G/LTE by deriving ciphering/integrity keys from CK(i) and IK(i) (specifically: from a key Kasme, formed by CK(i) and IK(i)).

In these cryptographic functions, which are provided both in the UE and in the HE, a shared key K is thus used.

K is a key (usually 128-bits) which is thus shared by the USIM and the HSS/AuC, where AuC is short for Authentication Centre. The shared key must be kept secret to other parties.

As a simplifying notational convention used in the remainder of the description of cryptographic and other forms of computations, parameters other than those explicitly mentioned may be input to functions such as Key Derivation Functions (KDF), Message Authentication Codes (MAC) and all other functions in all instances described herein. The parameters may be put in a different order than explicitly mentioned. The parameters may be transformed before being input to the function. For example, a set of parameters P1, P2, ... , Pn, for some non negative integer n, could be transformed by first being run through a second function f and the result of that, i.e., f(P1, P2, ... , Pn), being input to the function.

An example of a key derivation when a parameter P1 is first transformed before being input to a KDF to calculate a key called "output_key" could be a derivation of form output_key=KDF(f(P1), some other parameter), where f is some arbitrary function or chain of functions. The input "some other parameter" could be 0, 1 or more other parameters, e.g., used to bind the key to a certain context. Sometimes, the notation " ... " may be used as a synonym for "some other parameter". Parameters may be input as separate parameters or may be concatenated together and then input in one single input to the KDF. Thus, one of skill in the art will understand that additional parameters may be used, parameters may be transformed or re-arranged etc. and even in the presence of variations like these, the core of the idea remains the same.

As was mentioned above, the security of AKA depends on the key K being kept secret. Recently, it was reported in media that a USIM card manufacturer's security had been breached and a set of K-keys had "leaked out" (or fallen into wrong hands), thus putting the subscribers associated with these keys at risks such as impersonation, connection hijacking, and eavesdropping (since also the ciphering keys, derived from CK(i) and/or IK(i), are thus potentially also at risk). In the article, https://firstlook.org/theintercept/2015/02/19/great-sim-heist/it was mentioned that a potential problem with the AKA protocol, leading to the aforementioned security implications, lied in that AKA lacks so called perfect forward secrecy (PFS). PFS means that even if the long term key used to establish session keys is exposed, it still does not imply that past session keys are also exposed. That is, the session key is secure in a future where the long term key has been compromised. AKA in fact has an advantageous but weaker property, often referred to as key separation: even if the session keys (CK(i), IK(i), etc.) are exposed, past/future CK(j), IK(j) (and further derived keys) are not exposed. However, when the long term key K is exposed, all such security properties provide little value.

Aspects of the invention are concerned with improving on the above described authentication function through adding perfect forwarding secrecy. It is thus concerned with enhancing communication security for both user equipment and network.

However, before a description is made about how this is done in any detail, some more details of the environment will now be given.

Figure 2:
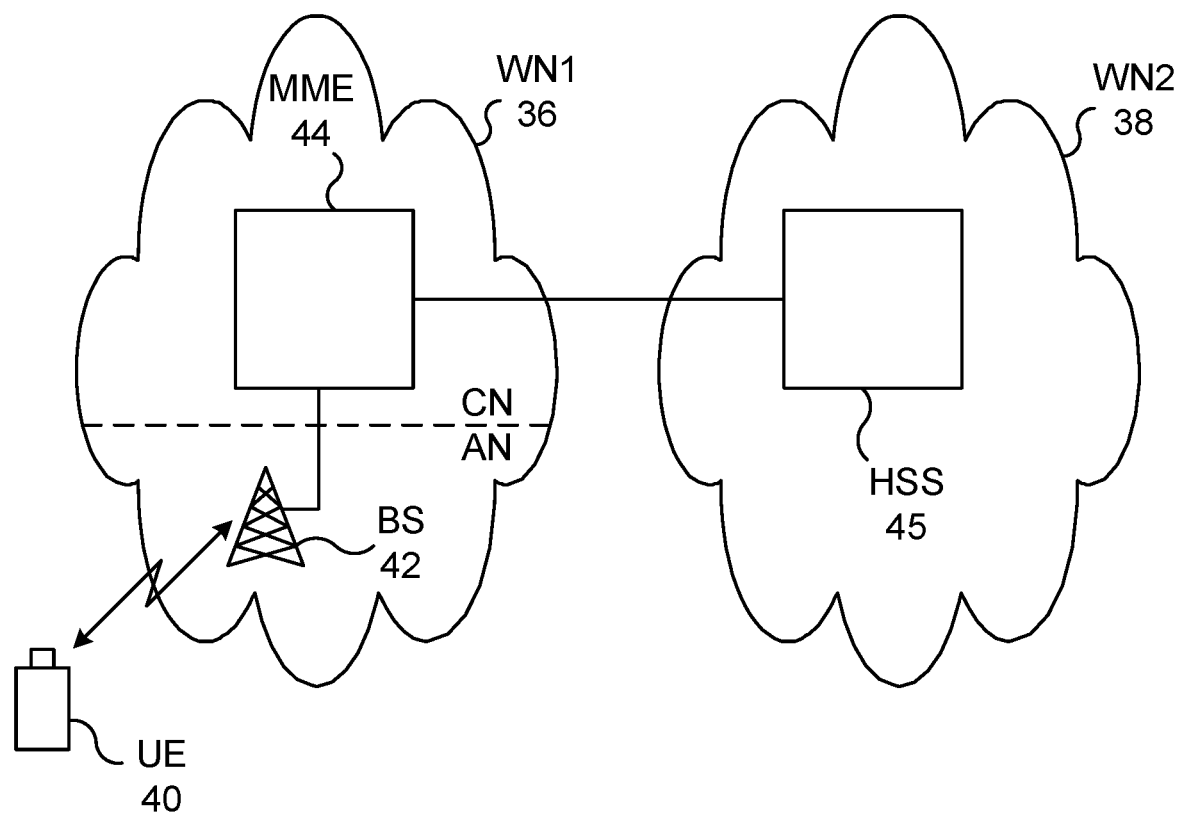

FIG. 2 schematically shows one exemplifying communication environment of a communication device 40, which communication device 40 in FIG. 2 is in the form of a user equipment (UE) for which the communication security is being enhanced. In this example there is a first and second communication network, which in this case are both mobile communication networks, such as LTE networks. A user equipment UE is in this case in wireless contact over an air interface with a base station BS 42 of a first communication network 36, which communication network is a first wireless network WN1. The base station 42 is in turn connected to a first network device 44 of the first wireless network WN1, which first network device 44 may also be considered to be a network node. In this example it is an MME. The MME 44 is in turn connected to a second network device 45 in a second communication network 38, which second communication network 38 is a second wireless network WN2. The second network device 45 is in this case an HSS and may be considered to be a network node. The first wireless network WN1 may be a visited network, i.e. a network that the UE visits, while the second wireless network WN2 may be a home network of the UE, i.e. a network hosting a subscription associated with the UE. The base station 42, which in many networks may be denoted nodeB or eNodeB is provided in a part of the first wireless network WN1 named an access network AN, while the MME 44 is provided in a part called a core network CN.

The first communication network 36 is thus in this example a network that is visited by the UE, while the second communication network 38 is a home network of the UE.

In different embodiments, each wireless network may comprise any number of wired or wireless networks, network nodes, base stations, controllers, wireless devices, relay stations, and/or any other components that may facilitate or participate in the communication of data and/or signals whether via wired or wireless connections.

Each wireless network may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

As can be seen in FIG. 1 the communication takes place between the UE and the first network device. However, as can also be seen, the authentication information (AVs) was in essence provided by the second network device in the home network of the UE.

As was mentioned earlier the invention is directed towards introducing perfect forward secrecy in a system such as that in FIG. 2.

One suitable scheme to use as basis is the scheme defined in the Diffie-Hellman protocol. This scheme implemented between the UE and the first wireless network WN1 is schematically indicated in FIG. 3.

Figure 3:
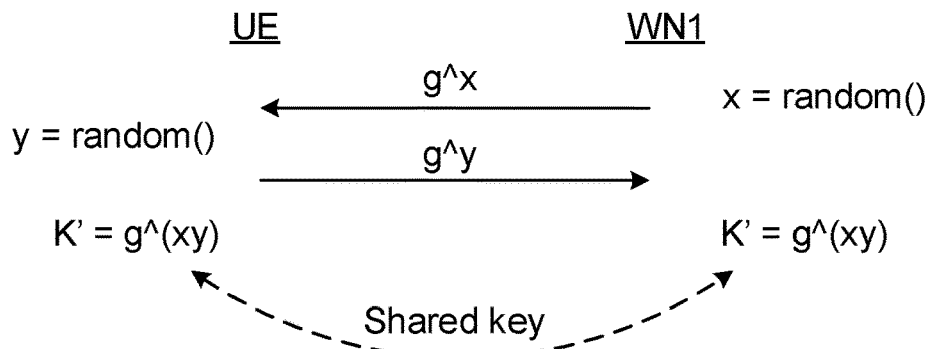

As can be seen in FIG. 3, the first wireless network WN1 (and then typically the first network device) sends a parameter that is generated as a base value g raised to a random number x and the UE responds with a parameter that is generated as the same base value g raised to another random number y (The term "random" should be understood as including both statistically random as well as pseudo-random.). The parameters should also be authenticated using e.g. a shared key (not shown). Once authenticated, the UE and first network device may use a common session key, which is thus also shared. A basis for the session key can be obtained as K'=g^(xy) or K'=g^(yx) (which will produce the same value K'). The key may more particularly be obtained as g raised to x raised to y, or, g raised to y raised to x, i.e.

$$(g^x)^y \text{ or} (g^y)^x.$$

As can be seen the session key K', which is a secure session key, may be generated based on the values x and y. The person of skill in the art will recognize that elliptic curves, and other cyclic groups where the discrete logarithm problem is hard, may also be used, however we for simplicity use multiplicative notation g^x even though additive notation x*g would be more appropriate in the elliptic curve case. See Menezes et al, Handbook of Applied Cryptography, fifth printing (August 2001), CRC Press, for more details.

Figure 4:
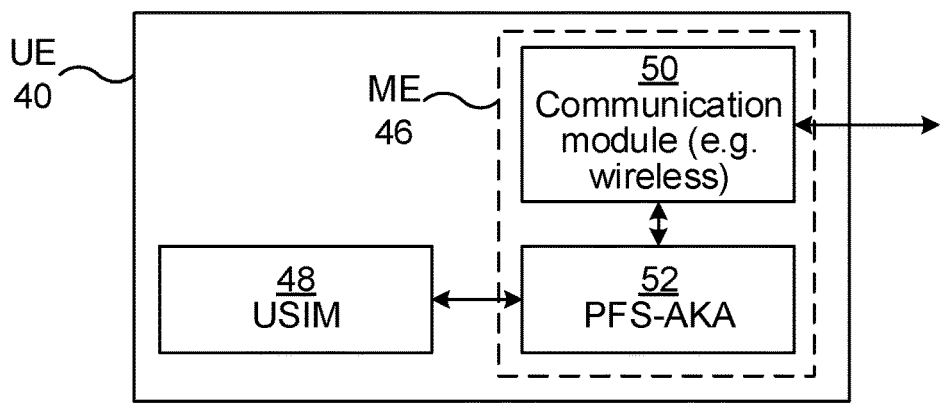
FIG. 4 shows a block schematic of the user equipment comprising an identity module and a mobile equipment.

FIG. 4 shows one exemplifying realization of the UE. The UE may comprise a universal subscriber identity module (USIM) 48, for instance in the form of a smart card being connected to a perfect forward security Authentication and Key Agreement (PFS-AKA) module 52, which in turn is connected to a communication module 50, which may be a wireless communication module. Here the communication module 50 and PFS-AKA module 52 together form a mobile equipment 46, while the USIM is an identity module 48. Thus, together, the USIM, PFS-AKA module, and communication module form the user equipment.

Figures 5, 6:
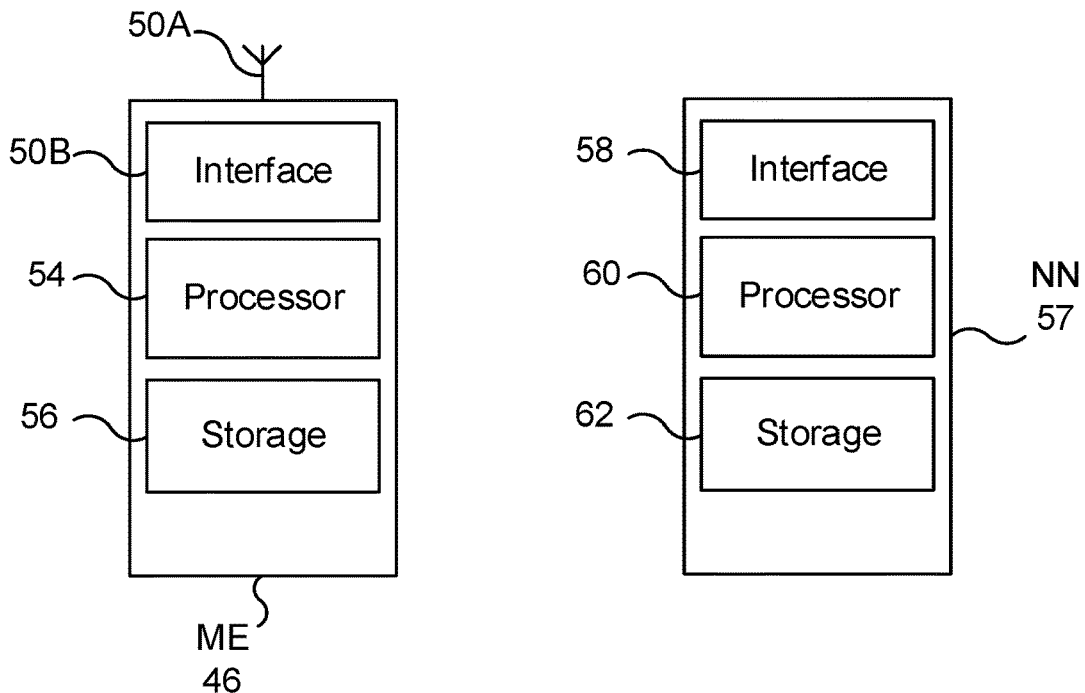
FIG. 5 shows a block schematic of the mobile equipment.
FIG. 6 shows a block schematic outlining a network device, which is applicable for a device acting as a node in both the first and second communication network.

One way of realizing the ME 46 is schematically shown in FIG. 5. ME 46 comprises processor 54, storage 56, interface 50B and antenna 50A. These components may work together in order to provide ME functionality, such as providing wireless connections in a wireless network. The components of ME 46 are depicted as single boxes located within a single larger box, however in practice an ME may comprises multiple different physical components that make up a single illustrated component (e.g., storage 56 may comprise multiple discrete microchips, each microchip representing a portion of the total storage capacity).

Processor 54 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other ME components, such as storage 56, ME functionality. Such functionality may include providing various wireless features discussed herein, including any of the features or benefits disclosed herein.

Storage 56 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 56 may store any suitable data, instructions, or information, including software and encoded logic, utilized by ME 46. Storage 56 may be used to store any calculations made by processor 54 and/or any data received via interface 50B.

Interface 50B may be used in the wireless communication of signalling and/or data between UE and a network device, such as the base station 42. For example, interface 50B may perform any formatting, coding, or translating that may be needed to allow UE to send and receive data from base station 42 over a wireless connection. Interface 50B may also include a radio transmitter and/or receiver that may be coupled to or a part of antenna 50a. The radio may receive digital data that is to be sent out to base station 42 via a wireless connection. The radio may convert the digital data into a radio signal having the appropriate channel and bandwidth parameters. The radio signal may then be transmitted via antenna 50a to base station 42.

Antenna 50a may be any type of antenna capable of transmitting and receiving data and/or signals wirelessly.

The storage 56 may also comprise instructions for handling Perfect Forward Secrecy in relation to communication of the ME to the first wireless network.

The storage 56 may more particularly comprise computer instructions causing the processor 54 to implement the PFS-AKA module 52. The communication module 50 may in turn in essence be implemented through the combination of the interface 50B and antenna 50A.

FIG. 6 shows a general network device 57, the structure of which is applicable for both the first and the second network device 44 and 45. The network device 57 comprises processor 60, storage 62 and interface 58. These components are depicted as single boxes located within a single larger box. In practice however, a network device may comprise multiple different physical components that make up a single illustrated component (e.g., interface 58 may comprise terminals for coupling wires for a wired connection). Similarly, network device 57 may be composed of multiple physically separate components, which may each have their own respective processor, storage, and interface components. In certain scenarios in which network device 57 comprises multiple separate components, one or more of the separate components may be shared among several network devices.

Processor 60 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network device components, such as storage 62, network device functionality. For example, processor 60 may execute instructions stored in storage 62.

Storage 62 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 62 may store any suitable instructions, data or information, including software and encoded logic, utilized by network device 57. Storage 62 may be used to store any calculations made by processor 60 and/or any data received via interface 58.

Network device 57 also comprises interface 58 which may be used in the wired communication of signalling and/or data between network device 57, network WN1 or WN2, and/or UE. For example, interface 58 may perform any formatting, coding, or translating that may be needed to allow network device 57 to send and receive data from network WN1 or WN2 over a wired connection.

Aspects of the invention are concerned with adding PFS to AKA.

The following embodiments will be described in 4G/LTE context for simplicity, but it is also applicable to IMS AKA (IP Multimedia Subsystem AKA) and EAP-AKA (Extensible Authentication Protocol-AKA) and embodiments are also currently seen as applicable to the currently discussed 5G systems or any other future system based on AKA, or other settings in which identity modules with pre-shared keys are used.

As mentioned above, aspects of the invention are concerned with providing perfect forward secrecy in the communication between the communication device and the first network device, with advantage based on the Diffie-Hellman (DH) protocol.

This protocol requires, however, computational effort and additional bandwidth to carry the necessary parameters: the exchanged DH parameters are much larger than the parameters of the currently standardized AKA protocol (RAND, RES, etc.). Even if it was possible to increase the number of bits signaled over the air interface, it would be desirable to maintain the standardized USIM-ME interface in the UE, which implies a bottleneck for the size of the protocol parameters which falls below the level were DH offers strong security. (RAND is currently 128 bits and to reach a security matching the 128-bit strength of AKA, DH parameters of at least 256-bits are needed for elliptic curve variants of DH, and around 3000-bits for standard discrete logarithm DH modulo a prime, p.) Moreover, DH is sensitive to a man-in-the-middle (MITM) attack implying need of adding some mechanism to authenticate the DH parameters. The natural approach to do this would be to add another data field to AKA and lead to even more signaling overhead.

One object is therefore to raise the security level of communication between a communication device and a communication network in relation to the use of long-term shared keys. It may also be of interest to avoid sending additional messages. It is thus desirable that the existing message structure is used without adding new messages. This may be important from an energy saving perspective both regarding the communication device as well as on a general environmental level, since the sending of additional messages uses energy, which may be a limited resource especially in the communication device. Furthermore, network communication is also typically standardized and it is often much harder to agree on the introduction on new messages, than the adding of new elements in already existing messages which would be necessary to provide authentication and MITM protection if using a straight-forward approach to adding perfect forward secrecy.

Before proceeding, some observations about authentication in protocols providing PFS, exemplified by the DH protocol, is beneficial. In the specific context of AKA, one of skill in the art may be tempted to use one or more of the AKA result parameters produced by the computations in the USIM, i.e. RES, CK and or IK for this purpose. This is in general dangerous to the security. Computing e.g. the DH parameters $g\hat{}x$ and/or $g\hat{}y$ via $x=F'(CK, IK)$ and/or $y=F'(CK, IK)$ for some function F' will not lead to perfect forward secrecy as these parameters can be computed from knowledge of the long term key K. Therefore, while re-use of AKA parameters and protocols data fields is beneficial, it has to be exercised with caution. Therefore x and y should be independent of AKA parameters.

On the other hand, for protection against MITM, we may use one or more of the AKA parameters and add a standard MAC. For example, an AKA response from the UE could comprise:

$$RES, g\hat{}y, MAC(CK\|IK\| \ldots, g\hat{}y\| \ldots).$$

(This is thus possibly another MAC function not to be confused with the aforementioned MAC parameter of the AKA protocol. Also note that since we are considering a fixed set of AKA parameters, we suppress the index i and write e.g. CK instead of CK(i) as above.) Note that there will generally be plural options for which key to use in the MAC, i.e. as the first parameter in the input to MAC( . . . , . . . ). So as not to obscure the description with too much detail, we therefore often suppress the key (and other less important parameters), e.g. writing MAC($g\hat{}y$) instead of MAC (CK$\|$IK$\|$ . . . , $g\hat{}y\|$ . . . ) as above. Where . . . indicates possibly other variables/parameters and II denotes a way to combine the inputs to the MAC function, e.g., concatenation. However, an even more economical way would be to incorporate the MAC above in the existing information element carrying the RES when it is transmitted from the UE to the MME, e.g. computing RES'=MAC(RES, $g\hat{}y$, . . . ), using RES (and optionally CK, IK) as key and thus the UE responding with RES', $g\hat{}y$ only. The MAC function may be based on HMAC, one of the native AKA f-functions (as defined in 3GPP TS 33.102) or another suitable function, e.g. based on AES. As RES is computed as a MAC that is based on $g\hat{}y$ and a key-value (CK/IK or RES), it is clear that it in fact is a verification code for the authenticity of $g\hat{}y$. Furthermore, when the MAC is also based on RES as the key, it can at the same time be used for verifying RES. It should here also be realized that a MAC is just one possible function that can be used for calculating RES'. Another example is a key derivation function or a pseudorandom function in general.

Similar considerations apply for the DH value $g\hat{}x$ transmitted from the network to the ME in order to save communication overhead and yet provide PFS.

Specifically, the AuC/HSS may in some embodiments generate the authentication vectors sent to the serving network accordingly, i.e. compute parameters such as RAND=$g\hat{}x$, apply a hash to RAND before inputting it to the f-functions, etc. Thus, $g\hat{}x$ is effectively carried in the RAND AKA protocol field without adding a new information element. In some embodiments, the HSS does not need to send CK, IK (or keys derived therefrom such as Kasme) to the MME as part of Authentication Vectors (AV) since the resulting shared key will be based on $g\hat{}(xy)$ which is anyway not known to the HSS at time of AV generation. In other embodiments the AuC/HSS may include these CK, IK to be included in key generation. For example, in LTE keys are "bound" to the access network through inclusion of a PLMN (Public Land Mobile Network) identifier in the derivation of the Kasme key from CK, IK. Since the HSS as noted does not know $g\hat{}(xy)$ at the point when AVs are generated, a binding to PLMN ID could be achieved by including the PLMN ID in derivation of some further key from CK, IK and including that derived key in the AV. Also the MME may be adopted, i.e. given XRES in the AV from the HSS, it would in the embodiment above compute XRES'=MAC(XRES, $g\hat{}y$) before verifying subscriber authenticity, and it may derive Kasme as $F(g\hat{}(xy)\| \ldots)$ for some suitable function F, etc. The ME may compute Kasme similarly.

Figure 7:
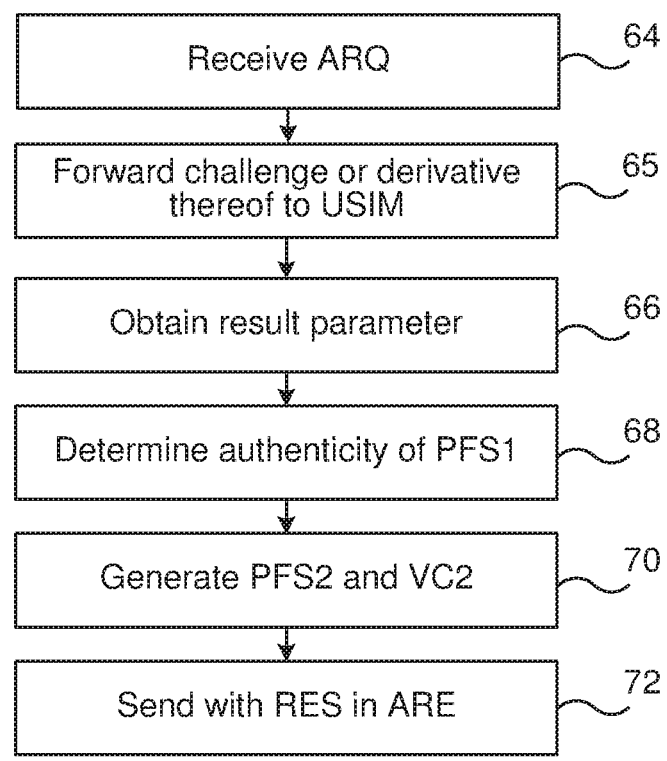
FIG. 7 shows a flow chart of a number of method steps in a method of enhancing the communication security of a communication device according to a first embodiment and being performed in the communication device.
Figure 8:
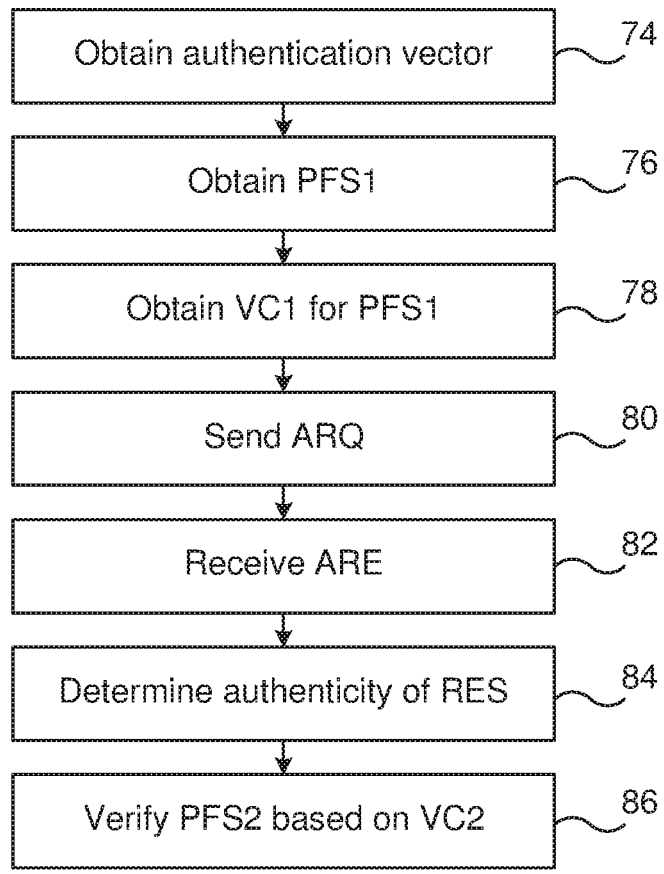
FIG. 8 shows a flow chart of a number of method steps in a method for a first network device in the first communication network according to the first embodiment and being performed in the first network device.

A first embodiment will now be described also with reference being made to FIG. 7 and FIG. 8, where FIG. 7 shows a flow chart of a method of enhancing the communication security of the user equipment in communication with a network device of a communication network and FIG. 8 shows a flow chart of method steps in a method of enhancing the communication security of the first network device of the communication network.

In the examples given here the communication network 36 is the first wireless network WN1 and the first network device 44 is the MME of the first wireless network.

The operation may start with the UE attaching to the first communication network 36. As a part of this, an identifier e.g. international mobile subscriber identity IMSI may be provided from the UE or rather from the USIM 48 of the UE to the first network device 44, which in turn sends a request for an authentication vector AV to the second network device 46 in the second communication network 38. The second network device 46 generates the authentication vector, which may comprise the authentication token AUTN, the random value RAND, the expected result of the verification computation XRES as well as an initial session Key Kasme. It may also comprise other keys such as the keys CK/IK. Thus, in so far, the second network node 45 may operate according to existing (3GPP) AKA specifications. In this way the first network device 44 obtains the authentication vector, step 74, which may at least comprise a random value RAND and an expected verification result XRES. Here it can be mentioned that RAND is provided for use as a challenge to the UE and AUTN comprises a challenge verification code for this challenge.

After having obtained the authentication vector, the first network device then obtains a first PFS parameter PFS1, step 76, which first PFS parameter PFS1 may be obtained through generation as a base value g raised with a random value x, i.e. as g{circumflex over ( )}x, where the random value x may be generated by the first network device 44. Alternatively, the random value x and/or the first PFS parameter PFS1 is obtained from the second network device 45, in which case the second node 45 performs additional operations besides those currently specified by AKA. Thereafter the first network device 44 obtains a first verification code, VC1, for the first PFS parameter PFS1, step 78. In one variation it obtains VC1 by generating the verification code itself and in another variation, the second network device generates the first verification code. Thus in the second variation it is also the case that the second node 45 performs additional operations besides those currently specified by AKA. The first verification code VC1 may be generated as a Message Authentication Code (MAC) over the first PFS parameter PFS1 using a known key of the authentication vector, such as XRES or the initial session key Kasme, as key. When the second network device 45 generates the first verification code, the RAND value is based on the first PFS parameter PFS1. In this case, the RAND value may be generated by the second network device 45 as the first PFS parameter PFS1 or as a hash of the first PFS parameter PFS 1, such as a cryptographic hash. Thereby it is possible, e.g.

by the UE, to use the challenge verification code AUTN also as the first verification code VC1 for the first PFS parameter PFS1. Here it may also be mentioned that RAND in both these examples is in fact a challenge to the USIM 48 of the UE.

The first network device 44 then sends the challenge RAND, the first PFS parameter PFS1, possibly both encoded by the RAND information element, and the first verification code VC1 to the UE, which may with advantage be sent in an authentication request message ARQ, step 80. In case the first verification code VC1 is a separate code (i.e. different from AUTN), e.g. a dedicated MAC generated by the first network device 44, then also the authentication token AUTN may be separately provided in the message.

The challenge RAND, the first PFS parameter PFS1 (encoded in RAND or in an additional parameter) and the first verification code VC1 (encoded in AUTN or a separate code) are then received in the UE, step 64. They may more particularly be received through the authentication request message ARQ being received by the communication module 50 of the ME 46 and forwarded therefrom to the PFS-AKA module 52.

In the PFS AKA module 52 the challenge or a derivative thereof is forwarded to the USIM 48, step 65. This is done in order to forward a pure challenge to the USIM 48. The pure challenge may be obtained in one of two ways, depending on alternatives described above. If the RAND information element encodes the first PFS parameter PFS1 it may be obtained as a derivative through the PFS AKA module computing a hash of the RAND information element, i.e. a hash of $g^x$. This means that if RAND is not already a hash of the first PFS parameter $g^x$, then one may be computed at this stage. If the RAND information element does not encode the first PFS parameter PFS1, then the value of the RAND information element may be input directly to the USIM. Also if the challenge received by the PFS AKA module is a hash of the first PFS parameter, such as a cryptographic hash, it may be directly forwarded to the USIM. The forwarding is performed via the standardized USIM-ME interface in the UE.

As indicated earlier, the USIM 48 comprises a key K, with advantage a key K that is pre-shared with the second network device 45. It also comprises cryptographic processing means. This module 48 may then provide at least one result parameter (CK/IK) as a response to the challenge (RAND and AUTN). One result parameter may be one or more cryptographic keys such as a ciphering key CK and an integrity protection key 1K, which may be used by the PFS AKA module 52 to obtain the initial session key Kasme. Another result parameter may be a response parameter RES to the challenge, which response parameter has a response value. Such a response parameter thus has a cryptographic value computed based on the pre-shared key and said cryptographic processing means.

The mobile equipment 46 and more particularly the PFS AKA module 52 thus obtains, or rather receives the one or more result parameter, step 66, and goes on and determines the authenticity of the first PFS parameter PFS1, i.e. the authenticity of $g^x$, step 68. It thus determines, based on VC1 and the one or more result parameter whether the PFS parameter PFS1 is authentic. This may be done through the key for the first verification code being based on one or more of the result parameters and using said key to verify a MAC carried in VC1. If the first verification code is a part of the challenge or rather is carried in the challenge verification code AUTN, i.e. the MAC-subfield of AUTN then it is sufficient that a result parameter is obtained in order to determine the authenticity. I.e. the USIM 49 would not even provide any of the result parameters if verification of AUTN had failed internal to the USIM, instead it will return an error status code. The first verification code may thus be provided as at least a part of the challenge verification code. Authenticity is thus determined based on the USIM 48 providing the at least one result parameter.

The at least one result parameter may comprise an error indication, indicating failure by the identity module to verify said challenge or, derivative of the challenge using the pre-shared key K and the cryptographic processing means. This may be the case when RAND=$g^x$ abd-AUTN verification fails internally to the USIM. If such an error signal is received by the PFS AKA module 52, it may directly determine that the first PFS parameter is not authentic.

Thereafter the ME 46 or rather the PFS AKA module 52 of the ME 46 generates a second PFS parameter PFS2 and a second verification code, VC2, step 70, which second PFS parameter PFS2 may be generated as the base value g raised with another random value y, i.e. as $g^y$. The verification code VC2 may in turn be generated as a message authentication code (MAC) of the second PFS parameter PFS2 and a key, e.g. one of the result parameters, or a derivative, Kd, of a result parameter, e.g. Kasme. The second verification code may thus be computed using the second PFS parameter and a result parameter or a derivative of a result parameter. If this second verification code VC2 is generated based on the response parameter RES, VC2 may be encoded in the information element normally carrying RES. It may then be generated as a function of RES and $g^y$, such as a MAC of RES and $g^y$, where RES acts as a key. Thus, the PFS module either calculates VC2 as MAC(Kd, $g^y$, . . . ), as MAC(Kasme, $g^y$, . . . ), or as MAC(RES, $g^y$, . . . ). The second PFS parameter PFS2 and the second verification code VC2 are then sent to the first network device, either together with the separate response parameter RES (if Kd was used as key), or (if RES was used as a key) by encoding VC2 in what would normally be the RES information element, step 72, and may more particularly be sent in an authentication request response message ARE.

The PFS AKA module 52 may also verify whether the first and second verification codes satisfy a specific relation. This may be the case when the first PFS parameter, i.e. $g^x$, is not encoded in the challenge RAND and where the first verification code VC1 is a separate code, for instance an explicit MAC, which is verified outside the USIM. In this case the specific relation is equality.

The second PFS parameter PFS2 and the second verification code VC2 and possibly also the separate response parameter are thus received by the first network device 44, for instance in the authentication request response message ARE, step 82. The first network device 44 then determines the authenticity of the response parameter RES, step 84, which may be done through comparing the challenge result or response parameter value RES with the expected challenge result XRES. Finally the second PFS parameter PFS2 is verified based on the second verification code VC2, step 86. If the second verification code VC2 is provided separately from the response RES, the verification in step 86 may be based on a MAC of the second PFS parameter, using the initial session key Kasme or a derivative thereof, Kd, as key, for verifying the second verification code VC2. In case the second verification code VC2 was provided as a function based on the response parameter value as a key, and VC2 was encoded in the RES parameter, then the first network device may perform steps 84 and 86 simultaneously, since a correct value for the second verification code implies that the UE used the correct RES, i.e. the same values as indicated by XRES.

Thereby a scheme has been implemented that enhances the communication security. It more particularly enhances the security if the secret, pre-shared key has been compromised as it provides perfect forward secrecy.

In ensuing sessions, e.g. data or signalling exchange between the UE and the network and more particularly between the UE and the first network device 44 it is then possible that a session key is used to protect communication and that this session key is based on the first and second PFS parameters. The session key may more particularly be based on the base g raised with the value x raised with the value y according to $g^{(xy)}$. Alternatively, a derivative of a combination of Kasme and $g^{(xy)}$ may be used. Thereby it can be seen that a secure session key is obtained that is at least based on the values x and y used for generating the first and second PFS parameters. It is thus generated based on one of the PFS parameters and the exponent of the other PFS parameter. This may more particularly mean that the PFS AKA module 52 may generate the session key based on the first PFS parameter PFS1 and the exponent y of the second PFS parameter PFS2, while the first network device 44 may generate the session key based on the second PFS parameter PFS2 and the exponent x of the first PFS parameter PFS1.

Figure 9:
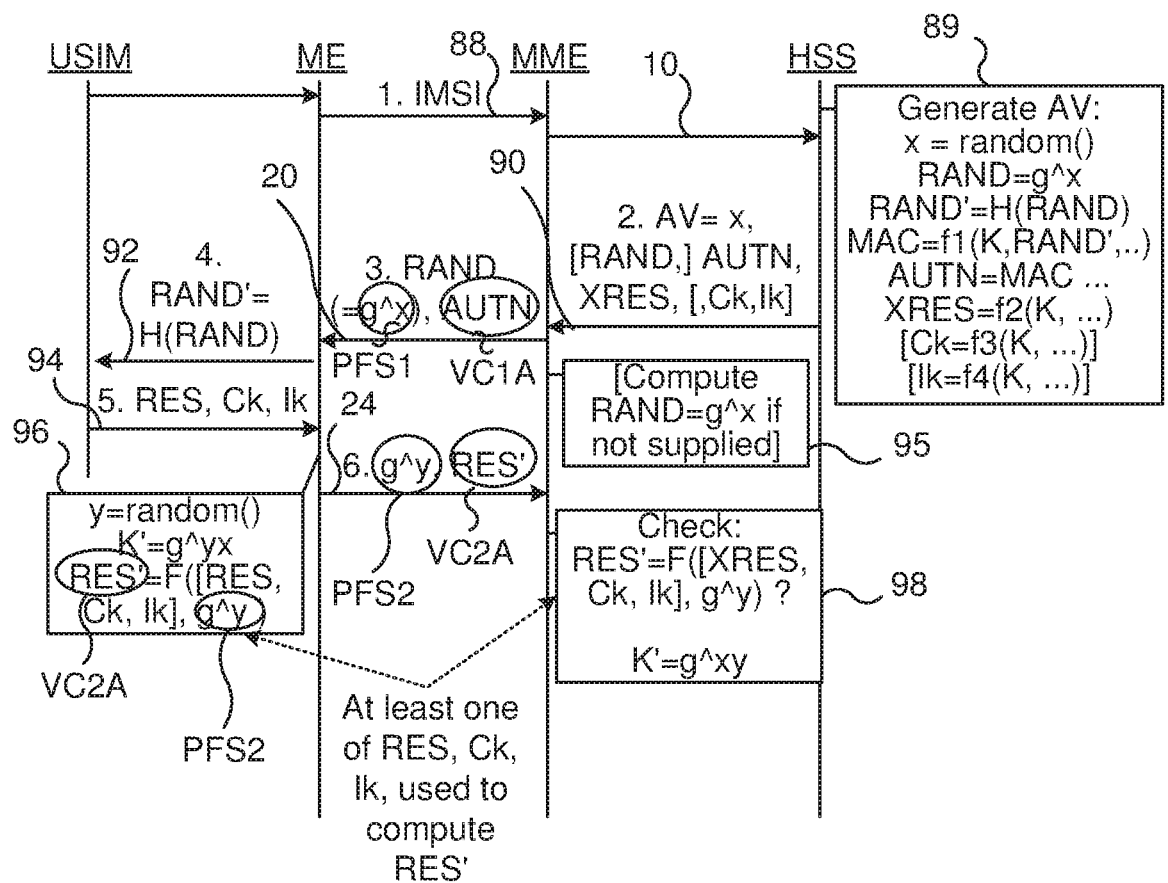
FIG. 9 shows a signalling chart with signals exchanged between the communication device, the first network device and a second network device in the second communication network according to a second embodiment.

Now a second embodiment will be described with reference being made to FIG. 9, which shows a signalling chart involving the second network device in the form of the HSS, the first network device in the form of the MME and the user equipment being separated into the ME and the USIM. In this embodiment the second node (HSS) performs steps that are not part of current AKA specifications and to FIG. 10, which shows the challenge verification code in more detail.

Figure 10:
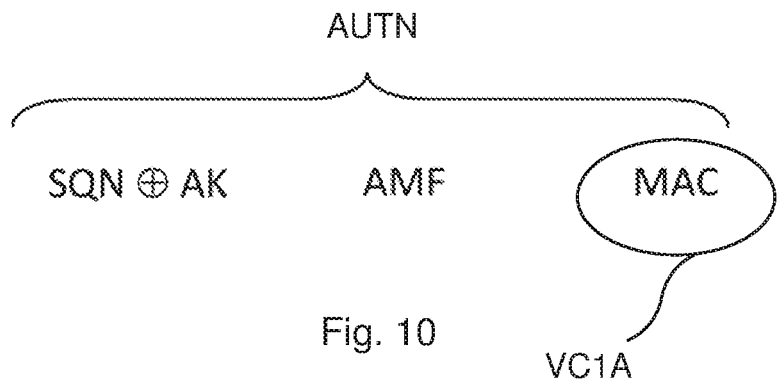
FIG. 10 shows a challenge verification code in more detail.

As can be seen in FIG. 10 and as was described earlier, the challenge verification code provided by the AUTN parameter comprises the fields: AMF (Authentication Management Field), MAC (Message Authentication Code) and the sequence number indication SQN, which in this case is encrypted by an anonymity key AK). It can also be seen that the MAC field is used as the first verification code VC1A. Here it may be mentioned that it is possible to also use the SQN field for the first verification code.

The second embodiment is based on using the RAND parameter to carry a DH value as a PFS parameter when sent from the network/a network device to the UE/communication device: RAND=$g^x$ or a derivative of $g^x$.

Note that a PFS parameter computed in accordance with some variations of DH may be substantially larger than 128-bits which is the current standardized size of RAND. Therefore, it could pose problems with the USIM-ME interface. To address this, before inputting RAND to f-algorithms in the USIM (and in the HSS, Home Subscriber Server) the provided RAND value may be compressed, e.g. by cryptographic hashing: RAND'=H(RAND)=H($g^x$), where H is a suitable function producing the appropriate number of bits, for example, H may be based on SHA2 (where SHA stands for Secure Hash Algorithm), AES (Advanced Encryption Standard), HMAC (key-Hashed Message Authentication Code), etc. In principle H could also be a function that selects a set of 128 bits from the RAND, e.g., the 128 least significant bits. On the UE side, H may similarly be applied in the ME (e.g. in a PFS module), before inputting RAND' to the USIM. As the RAND is a challenge directed towards the USIM, it can be seen that ME may thus generate a derivative of the challenge and forward it to the USIM. As a consequence, the AKA MAC-field (being comprised inside AUTN) will be computed in dependency of RAND', but through the use of H, it will in effect still be computed in dependency of RAND, i.e. $g^x$. Therefore, authentication from the AuC (Authentication Center)/HSS to the USIM of this DH value is obtained, preventing MITM attacks, in particular between the serving network and UE as any spoofing or modification of $g^x$ while in transit would be detected by the AUTN verification in the USIM in the UE.

With reference to FIGS. 4 and 7, this means that modifications or fabrications of the first PFS parameter PFS1 will imply that with high probability, the AUTN (more precisely the MAC-subfield) will be incorrect. Verification of AUTN will then fail internal to the USIM 48 and the USIM will not even provide any of the results parameters Authenticity of the first PFS parameter is thus determined based on the USIM 48 providing the at least one result parameter.

The larger RAND value can be computed by the AuC/HSS and sent in a modified form of the Authentication Vector (AV) to the MME (Mobile Management Entity). Another possibility is that the MME receives a regularly sized RAND in the AV and extends the RAND by appending or prepending a set of bits to the RAND before transmitting it to the UE. In this latter case, the choice of function H must match how the MME extended the received RAND, otherwise the USIM would reject the RAND/AUTN pair.

The rest of this second embodiment is identical to the first embodiment in the special case that the AUTN is to be used for providing the first verification code VC1 (corresponding to VC1A below), or, equivalently, that the first PFS parameter PFS1 is encoded into the RAND information element. The operation of the second embodiment may more particularly be the following and as showed in FIG. 9.

As part of e.g. network attach 88, an identifier, e.g. the IMSI (International Mobile Subscriber identity) is provided from the UE (USIM). This is forwarded 10 to the HSS.

The HSS generates 89 authentication vector(s) (AVs). Some new components added by this embodiment are highlighted (other parts are generally unaffected). In particular, RAND is generated as $g^x$ as discussed, and a compressed version of it, RAND', is used in the normal AKA computations of f1, f2, . . . etc. In the response AV 90, the HSS includes/adds x (to allow the MME to later compute the shared key). Therefore, the HSS may omit to send RAND as the MME may be able to compute RAND from x. Similarly, since the session key, K', may now be deduced from the DH values ($g^x$ and $g^y$) it may not always be necessary to send CK and IK (or keys derived therefrom, e.g. Kasme of LTE) at all. Whether CK and IK need to be transferred depends on details of the embodiment as discussed elsewhere in this disclosure.

The MME forwards 20 RAND and AUTN to the UE/USIM. Here RAND is the challenge as well as the first PFS parameter PFS1 and the MAC field of AUTN is the first verification code VC1A for the first PFS parameter PFS1 as it has been calculated in dependence of RAND, which is also, in effect, $g^x$.

The UE (e.g., the ME part) computes RAND'=H(RAND) and sends it 92 to the USIM for AKA parameter derivation (RES, CK, IK). As noted, when the USIM internally verifies the MAC-part of AUTN, this also serves to verify authenticity of $g^x$.

The USIM may respond 94 by RES, CK, IK. Through the ME receiving this response it is also able to determine that the first PFS parameter PFS1 is authentic as otherwise a response comprising these parameters would not be provided.

The UE generates 96 a DH value g^y and associated authentication information. It thus generates a second PFS parameter PFS2 and a second verification code VC2A. The second verification code VC2A could be realized as a value RES' of form MAC(Kd|| . . . . , g^y|| . . . ). The exact format (which key Kd to use, etc.) of the authentication information may vary:

In one variation, only RES is used as basis for the key Kd.

In another variation RES and at least one of CK, IK are used as basis for Kd (this assumes the HSS included these when generating authentication vectors). It is also possible to use Kasme as basis for Kd. The second verification code VC2A may thus be generated as RES' through RES being used as a basis for the key Kd. Note that if RES is not included in deriving the authentication/response RES', the ME may need to send also RES. In general, RES' may replace RES of current AKA protocols, or, may be sent as an extra parameter, alongside RES:

The ME then sends 24 g^y and RES' to the MME.

The MME may perform the corresponding calculations 98 to verify RES' and compute the shared key K'. Besides dependency on g^(xy), K' could also be computed in dependency of CK, IK (or a Kasme key), if supplied by the HSS, e.g. K'=G(g^(xy), CK, IK, . . . ) for a key derivation function G. Further keys (e.g. for data protection such as ciphering) may be derived from K' by UE and MME (not shown).

In a variation of the second embodiment, the challenge used is a hash of g^x. This means that the RAND being generated by the HSS and sent by the MME to the UE is a hash of g^x. This would have to be accompanied also by g^x. Thereby RAND can be directly sent from the ME to the USIM without the ME calculating a hash of it.

In a third embodiment, the second node may not need to perform any step that is not part of current AKA specifications. While some options exist below in which the second node does perform additional steps to current AKA specifications, these steps are optional and can be avoided if so desired.

In this embodiment, the RAND parameter is not used to transfer or carry information about the g^x from the network (serving or home network) to the UE. Consequently, AUTN cannot be used to carry the first verification code either. Instead, the network transmits the RAND separately to the UE, and includes the g^x in a new information element in the same message as the RAND. The transmission may as noted originate at the HSS, or, may originate at the MME (e.g. the MME generates a random x locally). In this case, the g^x needs to be authenticated and the network (serving or home) includes an additional MAC computed over the g^x in the message as well. The key for this MAC can be for example RES, or one of CK/IK or both. It may also be derivatives thereof such as Kasme. The function H would be the identity function in this embodiment. Thereby the derivative becomes identical to the challenge. One benefit with this embodiment is that the serving network (e.g. the MME) can choose the value x and there is no need for signaling this between the serving network and the AuC/HSS. In fact, the same signaling between these nodes as is used today can be re-used. A drawback is that the 128-bit RAND needs to be sent from the serving network to the UE as well as the larger g^x value. Hence some more bandwidth is required over the air interface.

The third embodiment will now be further described with reference being made to FIG. 10, which shows a signaling chart involving the USIM, ME, MME and HSS.

The operation may start with the MME sending a request 10 for authentication vectors to the HSS, which responds with an authentication vector response 100 comprising RAND, AUTN, XRES and the session key Kasme. The MME then generates the first PFS parameter PFS1 as well as generates the first verification code VC1B, where the first PFS parameter PFS1 may be generated as g^x and the first verification code VC1B may be generated as MAC(g^x) using e.g. XRES or Kasme as a common key. When this has been done, the MME sends the authentication request message 20 to the ME of the UE. The authentication request in this case comprises RAND, AUTN, g^x and MAC(g^x). The ME then forwards 102 the challenge RAND and the challenge verification code as part of AUTN to the USIM, which responds 104 with the keys CK/IK and the response parameter RES. Thereby the USIM has correctly responded to the challenge. The ME then authenticates the first PFS parameter PFS1 using the first verification code VC1B, which in this case may be done through the first verification code VC1B being generated through a common key, which in this case was XRES (which is identical to the response parameter value RES in the ME). The ME then generates a second PFS parameter PFS2 and a second verification code VC2B, where the second PFS parameter PFS2 may be generated as gay and the second verification code VC1B may be generated as MAC(g^y) using any of CK/IK, Kasme or RES, whichever is known to the MME, and sends these together with the result RES in the authentication response message 24. The MME then verifies the result through comparing RES with XRES and also verifies gay using MAC(g^y) and the appropriate key, e.g. CK/IK or XRES, etc. Thereafter the ME computes 106 a session key K' as a function of g^(xy), which function is typically a hash of g^(xy). Also the MME computes 108 a session key K' as the same function of g^(xy).

Thereby the UE can communicate with the first wireless network with improved security.

It should be realized that also in this third embodiment, it is possible to use RES' as second verification code e.g. if the key used to compute the second verification code VC2B is dependent on RES as in the previous embodiments.

Note that at all of the embodiments may be combined with the invention disclosed in U.S. Pat. No. 7,194,765. In this case, the HSS will not provide the MME with XRES, but rather XRES'=H(XRES). The UE may then explicitly signal RES to the MME so that MME can compute and verify XRES'. In this case, at least one of CK and IK (or some key derived therefrom) should be included in the computation of RES'.

Note again that since GBA and EAP-AKA make use of AKA, one of skill in the art will realize after this description that described embodiments can also be applied in those contexts by straight-forward modifications.

An advantage of at least one of the embodiments of the disclosure adds PFS to network authentication, e.g. mobile network authentication, at a low or even minimal cost, enabling and/or ensuring backward compatibility with SIM-ME interface for the AKA protocol. Another advantage of at least one of the embodiments of the disclosure is that it limits the effects of long term key compromises, such as hacked HSSes and hacked smart card vendor sites. Other advantages include avoiding the use of additional transmissions, which in turn saves energy.

Figure 12:
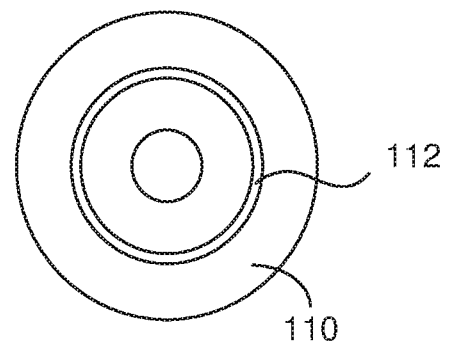
FIG. 12 shows a computer program product comprising a data storage medium with computer program code for implementing functionality of the communication device.

The computer program code of a mobile equipment may be in the form of computer program product for instance in the form of a data storage medium, such as a CD ROM disc or a memory stick. In this case the data storage medium carries a computer program with the computer program code, which will implement the functionality of the above-described mobile equipment. One such data storage medium 110 with computer program code 112 is schematically shown in FIG. 12.

Figure 13:
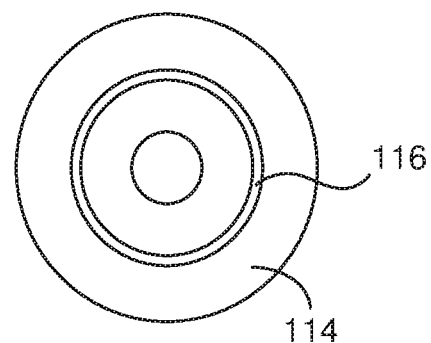
FIG. 13 shows a computer program product comprising a data storage medium with computer program code for implementing functionality of a network device.

The computer program code of the first network device may be in the form of computer program product for instance in the form of a data storage medium, such as a CD ROM disc or a memory stick. In this case the data storage medium carries a computer program with the computer program code, which will implement the functionality of the above-described first network device. One such data storage medium 114 with computer program code 116 is schematically shown in FIG. 13.

Figure 14:
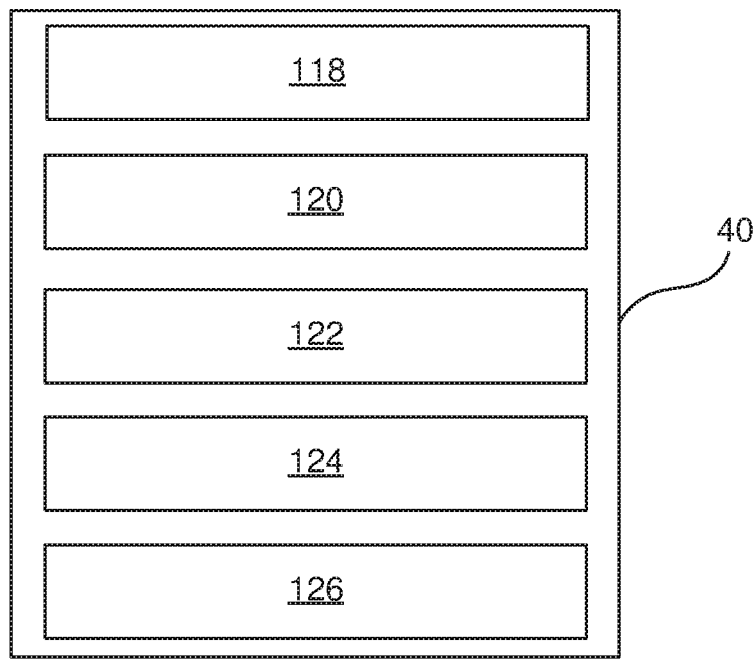
FIG. 14 shows a further way of realizing the communication device.

As is schematically shown in FIG. 14, the communication device 40 may in some embodiments comprise:

a receiving unit 118 for receiving a challenge, a first PFS parameter and a first verification code from a network device, a forwarding unit 120 for forwarding the challenge or a derivative thereof to an identity module, a receiving unit 122 for receiving at least one result parameter as response from the identity module, a determining unit 124 for determining, based on the result parameter whether the first PFS parameter is authentic, and a generating unit 126 for generating and sending a second PFS parameter to the network device if the determination is that the first PFS parameter is authentic. The units are in one embodiment corresponding to software instructions. In another embodiment the units are implemented as hardware units in one or more hardware circuits, like ASICs or FPGAs.

The communication device may further comprise a generating unit for generating a session key for communication between the communication device and the network device, where the session key is at least based on values used for generating the first and second PFS parameter.

The receiving unit 118 for receiving a challenge, a first PFS parameter and a first verification code may furthermore be a receiving unit for receiving the challenge, the first PFS parameter and the first verification code from the network device in an authentication request message, where the authentication request message also comprises a challenge verification code. The receiving unit 122 for receiving at least one result parameter may in turn be a receiving unit for receiving a response parameter as a response to the challenge and the generating unit 126 may be a generating unit for generating the second PFS parameter together with a second verification code and sending these in an authentication response message also comprising the response parameter.

The determining unit 124 may furthermore be a determining unit for determining the authenticity of the first PFS parameter using a first verification code comprised in a corresponding separate information element of the authentication request message.

If the first verification code is provided as at least part of the challenge verification code, the determining unit 124 may furthermore be a determining unit for determining the authenticity of the first PFS parameter based on the identity module providing the at least one result parameter.

The generating unit 126 may also be a generating unit for generating the second verification code based on the response parameter and sending the second verification code in an information element of the authentication response message assigned to the response parameter.

Figure 15:
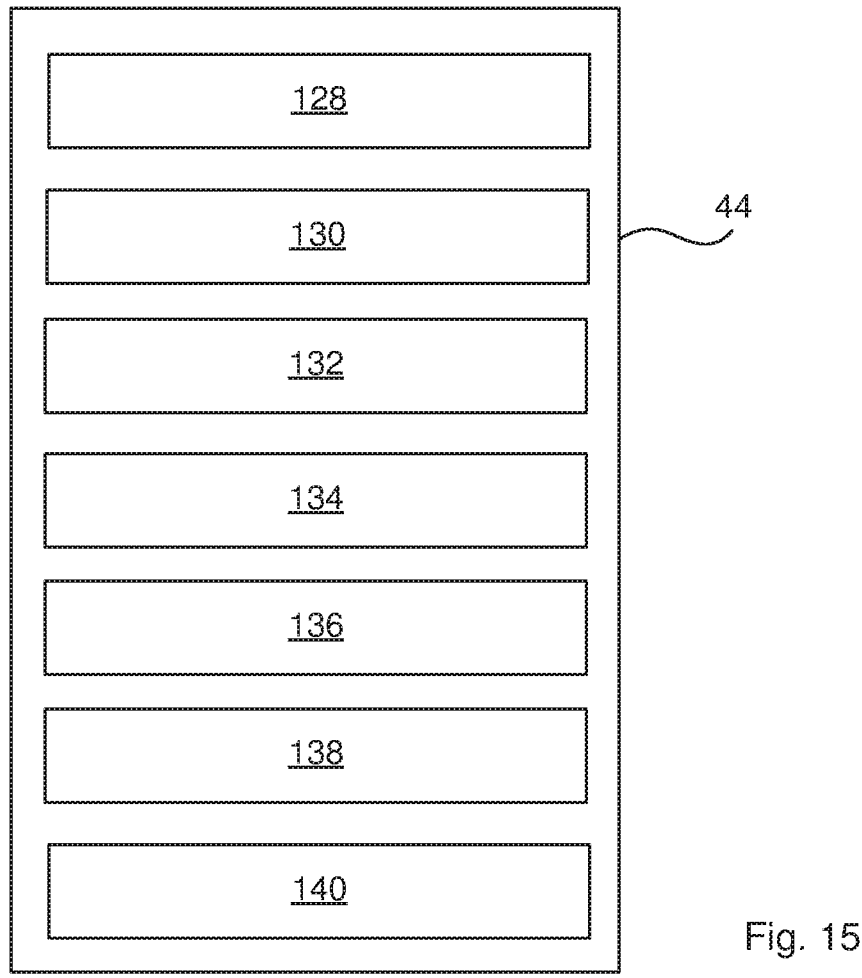
FIG. 15 shows a further way of realizing the first network device.

As is shown in FIG. 15, the first network device 44 may in some embodiments comprise:

an obtaining unit 128 for obtaining a challenge, an obtaining unit 130 for obtaining a first PFS parameter, an obtaining unit 132 for obtaining a first verification code for the first PFS parameter, a sending unit 134 for sending the challenge, the first PFS parameter and the first verification code to the communication device, a receiving unit 136 for receiving a second PFS parameter, a second verification code and a response parameter from the communication device, a determining unit 138 for determining the authenticity of the response parameter, and a verifying unit 140 for verifying the second PFS parameter based on the second verification code.

The units are in one embodiment corresponding to software instructions. In another embodiment the units are implemented as hardware units in one or more hardware circuits, like ASICs or FPGAs.

The first network device 44 may furthermore comprise a computing unit for computing a session key for communication between the communication device and the first network device, where the session key is at least based on values used for generating the first and second PFS parameter.

The obtaining unit 128 for obtaining the challenge may also be an obtaining unit for obtaining a challenge verification code, the sending unit 134 may be a sending unit for sending the challenge, the first PFS parameter and the first verification code in an authentication request message together with the challenge verification code and the receiving unit 136 may be a receiving unit for receiving the second PFS parameter, the second verification code and the response parameter in an authentication response message.

The obtaining unit 132 for obtaining the first verification may comprise a generating unit for generating the first verification code using the first PFS parameter and the sending unit 134 may be a sending unit for sending the first verification code in a corresponding separate information element of the authentication request message.

The first network device may also comprise a receiving unit for receiving a value x to be used in generating the first PFS parameter. The value x, which is an exponent value, may also be termed a seed value. In this case the obtaining unit 132 for obtaining the first verification code may be an obtaining unit for obtaining the first verification code as at least part of the challenge verification code and the sending unit 134 may be a sending unit for sending the first verification code as at least part of the challenge verification code in the authentication request message.

The obtaining unit 128 for obtaining the challenge may also be an obtaining unit for obtaining an expected challenge result and the determining unit 138 may be a determining unit for determining the authenticity of the response parameter through a comparison with the expected challenge result.

The response parameter may be included in the authentication response message through the second verification code being based on the response parameter. In this case the receiving unit 136 may be a receiving unit for receiving the second verification code in an information element of the authentication response message assigned to the response parameter and the determining unit 138 and the verifying unit 140 may be a combined determining and verifying unit for simultaneously determining the authenticity of the response parameter and verifying the second PFS parameter using the second verification code.

Figure 16:
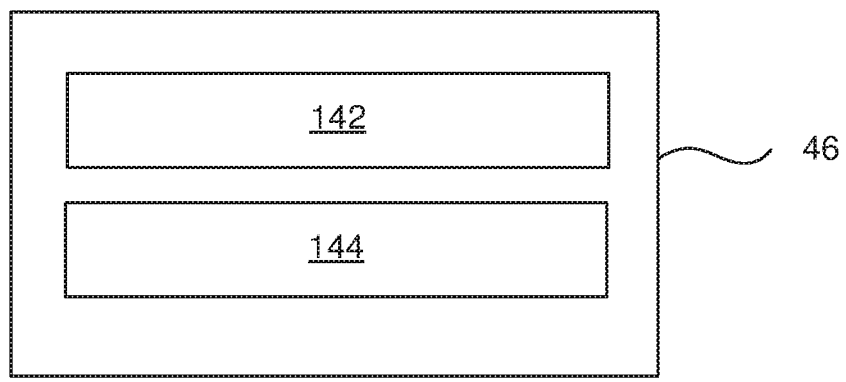
FIG. 16 shows a further way of realizing the second network device.

As is schematically shown in FIG. 16, the second network device may in turn in some embodiments comprise a sending unit 142 for sending a challenge to the first network device.

It may furthermore comprise a providing unit 144 for providing a value in order for the first PFS parameter to be obtained through generating it at least based on the value x, a generating unit for generating the challenge verification code using the first PFS parameter and a sending unit for sending the value to the first network device.

The units are in one embodiment corresponding to software instructions. In another embodiment the units are implemented as hardware units in one or more hardware circuits, like ASICs or FPGAs.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A communication device for communicating with a network device of a communication network, the communication device comprising:
   at least one processor circuit; and
   at least one memory connected to the at least one processor circuit and storing program instructions that are executed by the at least one processor to perform operations comprising:
      receiving, via a network, an authentication request from the network device, the authentication request comprising a challenge, a first Diffie-Hellman (DH) parameter, and a first verification code for the first DH parameter from the network device;
      forwarding a derivative of said challenge to an identity module used by the communication device to provide authentication request challenge responses for the communication device to connect to the communication network, wherein the identity module is hardware based and is physically connected to the communication device;
      receiving at least one result parameter as a response from the identity module, the at least one result parameter having been generated by the identity module and being one of a ciphering key (CK), an integrity key (IK) and a response parameter (RES);
      determining, based on said result parameter and said first verification code, whether said first DH parameter is authentic; and
      responsive to determining that the first DH parameter is authentic, generating a second DH parameter and sending, through the network, the second DH parameter, a second verification code, and the response parameter in an authentication response message to the network device to enable the network device to generate a session key for communication with the communication device.

2. The communication device of claim 1, being further operative to generate a session key for communication between the communication device and the network device, said session key being based on values used for generating the first DH parameter and the second DH parameter.

3. The communication device of claim 2, wherein the session key is based on the first DH parameter and an exponent of the second DH parameter.

4. The communication device according to claim 3, wherein said session key being further based on values used for generating the first DH parameter and the second DH parameter.

5. The communication device according to claim 1, wherein the communication device comprises a mobile equipment comprising the at least one processor circuit and the at least one memory, the mobile equipment configured to receive the challenge from the network, perform said forwarding, receive the at least one result parameter, determine whether the first DH parameter is authentic and generate and send the second DH parameter.

6. The communication device according to claim 1, wherein the communication device contains an interface to releasably retain and electrically communicate with the identity module, wherein said identity module is configured to perform key and cryptographic processing operations.

7. The communication device according to claim 1, wherein the first verification code comprises a message authentication code based on at least the first DH parameter.

8. The communication device according to claim 7, wherein said message authentication code is based on HMAC/SHA-256.

9. The communication device according to claim 1, wherein to forward the derivative of said challenge to an identity module, the at least one processor circuit is configured to send a derivative of the challenge to the identity module.

10. The communication device according to claim 9, wherein the derivative is a hash of the challenge.

11. The communication device according to claim 1, wherein the authentication request message comprises the first verification code in a corresponding separate information element of the authentication request message and the at least one processor circuit of the communication device determines the authenticity of the first DH parameter based on the first verification code.

12. The communication device according to claim 1, the at least one processor circuit being further configured to generate the second verification code based on at least one of the at least one result parameters and when being configured to send the authentication response message is operative to send the second verification code in an information element assigned to the response parameter.

13. The communication device according to claim 1, wherein the second verification code is generated as a message authentication code based on at least the second DH parameter.

14. A method for a communication device in communication with a network device of a communication network, the method being performed by the communication device and comprising:
   receiving, via a network, an authentication request from the network device, the authentication request comprising a challenge, a challenge verification code, a first Diffie-Hellman (DH) parameter and a first verification code for the first DH parameter from the network device;

forwarding a derivative of said challenge to an identity module used by the communication device to provide authentication request challenge responses for the communication device to connect to the communication network, wherein the identity module is hardware based and is physically connected to the communication device;

receiving at least one result parameter as a response from the identity module, the at least one result parameter having been generated by the identity module and being one of a ciphering key (CK), an integrity key (1K) and a response parameter (RES);

determining, based on said result parameter whether said first DH parameter is authentic; and responsive to determining that the first DH parameter is authentic, generating a second DH parameter and sending, through the network, the second DH parameter, the second verification code, and the response parameter in an authentication response message to the network device to enable the network device to generate a session key for communication with the communication device.

15. The method according to claim 14, comprising generating a session key for communication between the communication device and the network device, said session key being based on values used for generating the first DH parameter and the second DH parameter.

16. The method according to claim 15, wherein the session key is based on the first DH parameter and an exponent of the second DH parameter.

17. The method according to claim 15, wherein said session key being at least further based on values used for generating the first DH parameter and the second DH parameter.

18. The method according to claim 15, wherein the authentication request message comprises the first verification code in a corresponding separate information element of the authentication request message and the determination of the authenticity of the first DH parameter is made using the first verification code.

19. The method according to claim 15, further comprising basing the second verification code on the response parameter and the sending of the authentication response comprises sending the second verification code in an information element of the authentication response message assigned to the response parameter.

20. The method device according to claim 15, wherein the derivative is a hash of the challenge.

* * * * *

UNITED STATES PATENT AND TRADEMARK OFFICE
CERTIFICATE OF CORRECTION

PATENT NO. : 10,965,660 B2
APPLICATION NO. : 16/558891
DATED : March 30, 2021
INVENTOR(S) : Näslund et al.

Page 1 of 3

It is certified that error appears in the above-identified patent and that said Letters Patent is hereby corrected as shown below:

In the Specification

In Column 1, Line 9, delete "2018," and insert -- 2018, (now U.S. Pat. No. 10,659,447), --, therefor.

In Column 2, Line 20, delete "(AV1 . . . n)" and insert -- (AV(1 . . . n)) --, therefor.

In Column 2, Line 31, delete "Rand(i)" and insert -- RAND(i) --, therefor.

In Column 2, Line 33, delete "$AV_i$" and insert -- AV(i) --, therefor.

In Column 2, Lines 37-38, delete "user authentication response message (ARE) 20" and insert -- user authentication response (ARE) message 24 --, therefor.

In Column 3, Line 34, delete "integrity key, CK," and insert -- integrity key, IK, --, therefor.

In Column 3, Line 43, delete "is in in communication" and insert -- is in communication --, therefor.

In Column 3, Line 54, delete "integrity key, IJ," and insert -- integrity key, IK, --, therefor.

In Column 7, Line 48, delete "that that the existing" and insert -- that the existing --, therefor.

In Column 10, Line 56, delete "(WLAN)." and insert -- (WLANs). --, therefor.

In Column 11, Line 49, delete "$AV_i.$" and insert -- AV(i). --, therefor.

In Column 11, Line 51, delete "user authentication response message (ARE) 20" and insert -- user authentication response (ARE) message 24 --, therefor.

In Column 12, Line 38, delete "(KDF)," and insert -- (KDFs), --, therefor.

Signed and Sealed this
Thirty-first Day of May, 2022

Katherine Kelly Vidal
*Director of the United States Patent and Trademark Office*

CERTIFICATE OF CORRECTION (continued)
U.S. Pat. No. 10,965,660 B2

In Column 12, Line 39, delete "(MAC)" and insert -- (MACs) --, therefor.

In Column 13, Line 33, delete "equipment UE is in this case in wireless" and insert -- equipment, UE, in this case is in wireless --, therefor.

In Column 15, Line 23, delete "50a." and insert -- 50A. --, therefor.

In Column 15, Line 28, delete "50a" and insert -- 50A --, therefor.

In Column 15, Line 29, delete "50a" and insert -- 50A --, therefor.

In Column 17, Line 3, delete "and or" and insert -- and/or --, therefor.

In Column 17, Line 29, delete "and II" and insert -- and || --, therefor.

In Column 17, Line 59, delete "(AV)" and insert -- (AVs) --, therefor.

In Column 18, Line 23, delete "international mobile subscriber identity IMSI" and insert -- international mobile subscriber identity, IMSI, --, therefor.

In Column 18, Line 26, delete "authentication vector AV" and insert -- authentication vector, AV, --, therefor.

In Column 18, Line 45, delete "g{circumflex over ( )}x," and insert -- $g^x$, --, therefor.

In Column 18, Lines 66-67, delete "first PFS parameter PFS 1," and insert -- first PFS parameter PFS1, --, therefor.

In Column 19, Line 48, delete "protection key 1K," and insert -- protection key IK, --, therefor.

In Column 20, Line 41, delete "authentication request response message ARE." and insert -- authentication response (ARE) message. --, therefor.

In Column 20, Lines 52-53, delete "authentication request response message ARE," and insert -- authentication response (ARE) message, --, therefor.

In Column 21, Line 39, delete "sequence number indication SQN," and insert -- sequence number indication, SQN, --, therefor.

In Column 21, Line 40, delete "anonymity key AK)." and insert -- anonymity key, AK. --, therefor.

Figure 11:
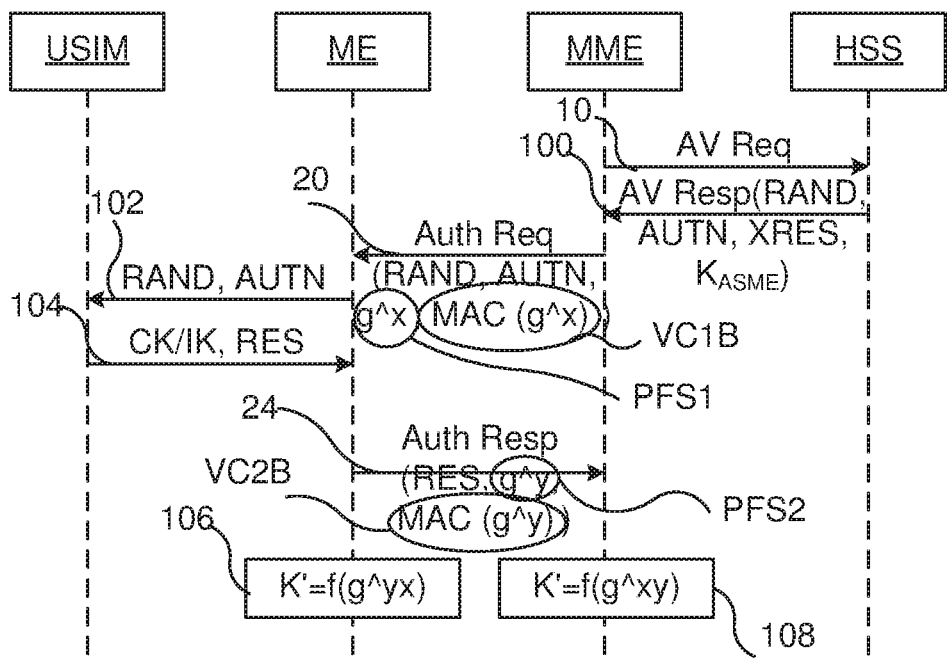
FIG. 11 shows a signalling chart with signals exchanged, between the communication device, the first network device and the second network device according to a third embodiment.

In Column 24, Line 5, delete "FIG. 10," and insert -- FIG. 11, --, therefor.

In Column 24, Line 33, delete "gay" and insert -- $g^y$ --, therefor.

In Column 24, Line 39, delete "gay" and insert -- $g^y$ --, therefor.

CERTIFICATE OF CORRECTION (continued)
U.S. Pat. No. 10,965,660 B2

In Column 24, Line 51, delete "that at all" and insert -- that all --, therefor.

In Column 25, Line 8, delete "CD ROM" and insert -- CD-ROM --, therefor.

In Column 25, Lines 18-19, delete "CD ROM' and insert -- CD-ROM --, therefor.

In the Claims

In Column 29, Lines 14-15, in Claim 14, delete "integrity key (1K)" and insert -- integrity key (IK) --, therefor.

In Column 30, Line 24, in Claim 20, delete "The method device according to claim" and insert -- The method according to claim --, therefor.